(12) United States Patent
Alberti et al.

(10) Patent No.: US 8,594,071 B2
(45) Date of Patent: Nov. 26, 2013

(54) DEVICE AND METHOD FOR CONTROLLING THE CREATION OF A USER CHANNEL CONNECTION IN A COMMUNICATION SYSTEM AND ASSOCIATED COMMUNICATION SYSTEM, DIGITAL STORAGE MEDIUM, COMPUTER PROGRAM PRODUCT, AND COMPUTER PROGRAM

(75) Inventors: Mathäus Alberti, Bocholt (DE); Sven Berauer, Berlin (DE); Stefan Hülder, Dorsten-Deuten (DE); Erich Kamperschroer, Hamminkeln (DE); Dieter Kehren, Dinslaken (DE); Günter Kleindl, Ybbs/Donau (AT); Stefan Koch, Kranenburg (DE); Jürgen Lepping, Essen (DE); Matthias Lungwitz, Bocholt (DE); Andreas Müller, Rees (DE); Christine Schmidl, München (DE); Wilfried Többen, Bocholt (DE); Torsten Waldeck, München (DE)

(73) Assignee: Gigaset Communications GmbH, München (DE)

( * ) Notice: Subject to any disclaimer, the term of this patent is extended or adjusted under 35 U.S.C. 154(b) by 839 days.

(21) Appl. No.: 12/531,448

(22) PCT Filed: Mar. 14, 2008

(86) PCT No.: PCT/EP2008/053072
§ 371 (c)(1),
(2), (4) Date: May 20, 2010

(87) PCT Pub. No.: WO2008/113754
PCT Pub. Date: Sep. 25, 2008

(65) Prior Publication Data
US 2010/0272095 A1 Oct. 28, 2010

(30) Foreign Application Priority Data
Mar. 16, 2007 (EP) .................................. 07005479

(51) Int. Cl.
*H04J 3/06* (2006.01)

(52) U.S. Cl.
USPC .......................................................... 370/350

(58) Field of Classification Search
USPC .......................................................... 370/350
See application file for complete search history.

(56) References Cited

U.S. PATENT DOCUMENTS

| 6,480,522 B1 * | 11/2002 | Hoole et al. ................... 375/130 |
| 6,625,443 B1 | 9/2003 | Kamperschroer et al. |

(Continued)

FOREIGN PATENT DOCUMENTS

| DE | 19738339 A1 | 3/1999 |
| EP | 1 061 718 A3 | 12/2000 |

(Continued)

OTHER PUBLICATIONS

PCT International Preliminary Report on Patentability and Written Opinion, PCT Application No. PCT/EP2008/053072, Oct. 6, 2009, 11 pages.
PCT International Search Report, PCT Application No. PCT/EP2008/053072, Oct. 17, 2008, 11 pages.

*Primary Examiner* — Kenny Lin
(74) *Attorney, Agent, or Firm* — Fenwick & West LLP

(57) ABSTRACT

In order to be able to control the creation of a user channel connection in a communication system using wireless communication between at least one mobile part and one wired part in such a way that a user channel connection is established more quickly upon a connection request indicated by the mobile part or the wired part for the purpose of transmitting user data and, at the same time, due to market requirements, no synchronization pulses are sent by the wired part in the idle state, an initiating device of the communication system (for example, for an incoming call: base station; for an outgoing call: mobile part) sends, from an asynchronous idle state, synchronization pulses (SB) to all available physical resources. Due to the plurality of the sent, available synchronization pulses (SB), rapid synchronization is ensured because the probability is sufficiently increased thereby that a pulse will fall in the search window of a receiver.

16 Claims, 17 Drawing Sheets

(56) References Cited

U.S. PATENT DOCUMENTS

| | | | |
|---|---|---|---|
| 7,245,650 B2 * | 7/2007 | Kuroyanagi et al. | 375/141 |
| 7,430,262 B2 | 9/2008 | Forte | |
| 2005/0227734 A1 | 10/2005 | Euscher | |
| 2008/0025452 A1 * | 1/2008 | Toda et al. | 375/364 |

FOREIGN PATENT DOCUMENTS

| | | |
|---|---|---|
| EP | 1061718 A | 12/2000 |
| WO | WO 02/073848 A | 9/2002 |
| WO | WO 2005/034489 A | 4/2005 |

\* cited by examiner

FIG 1 State of the Art
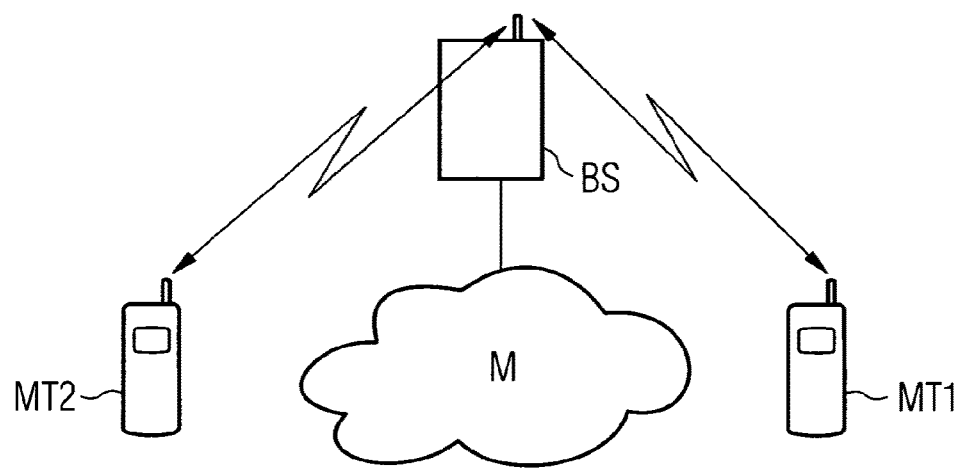
FIG 3
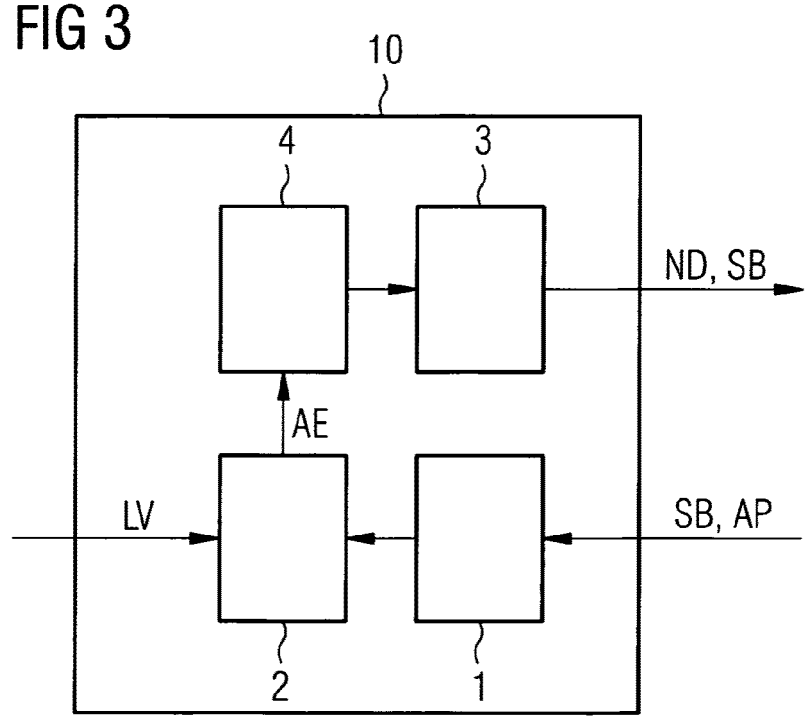

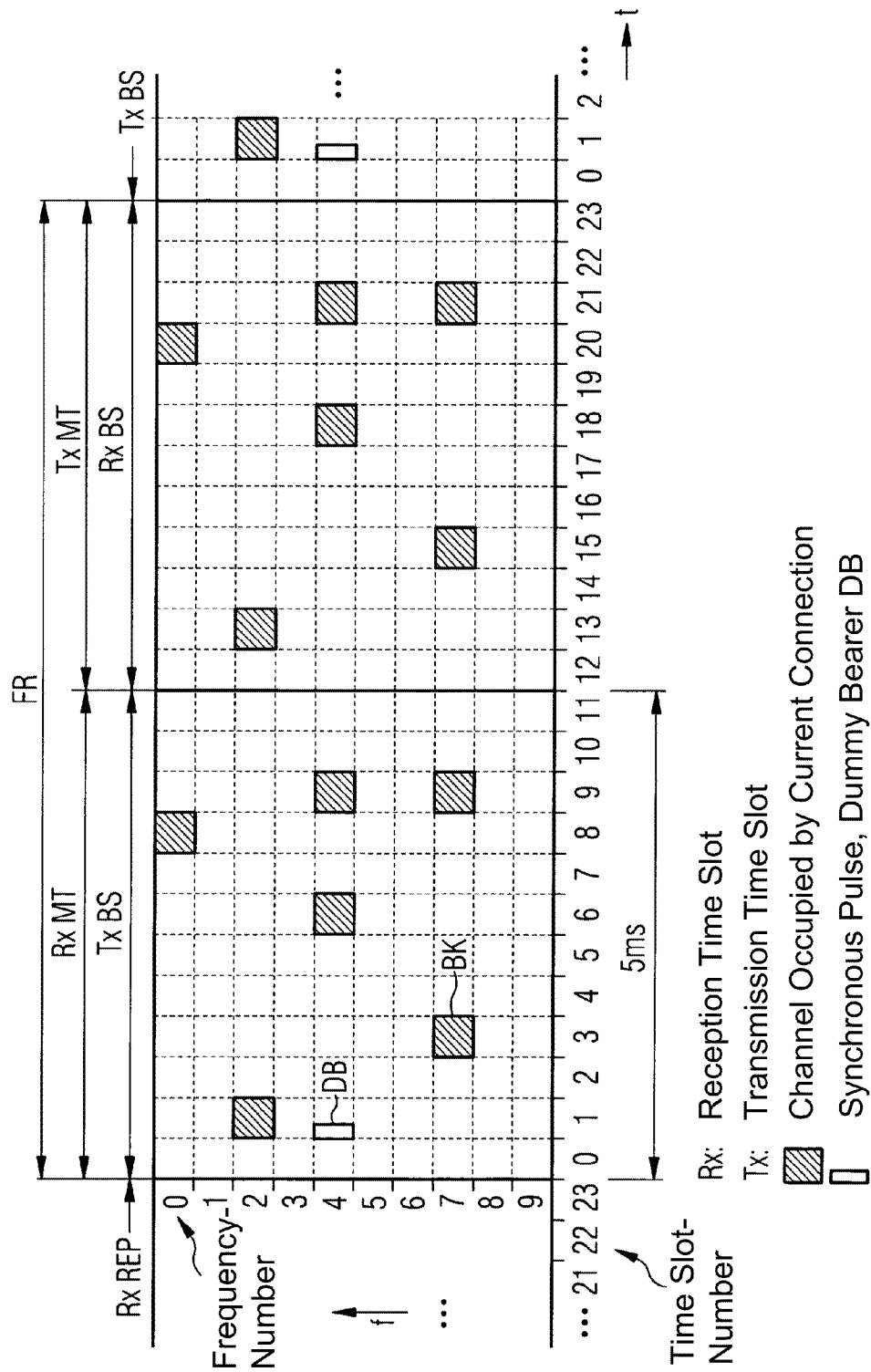

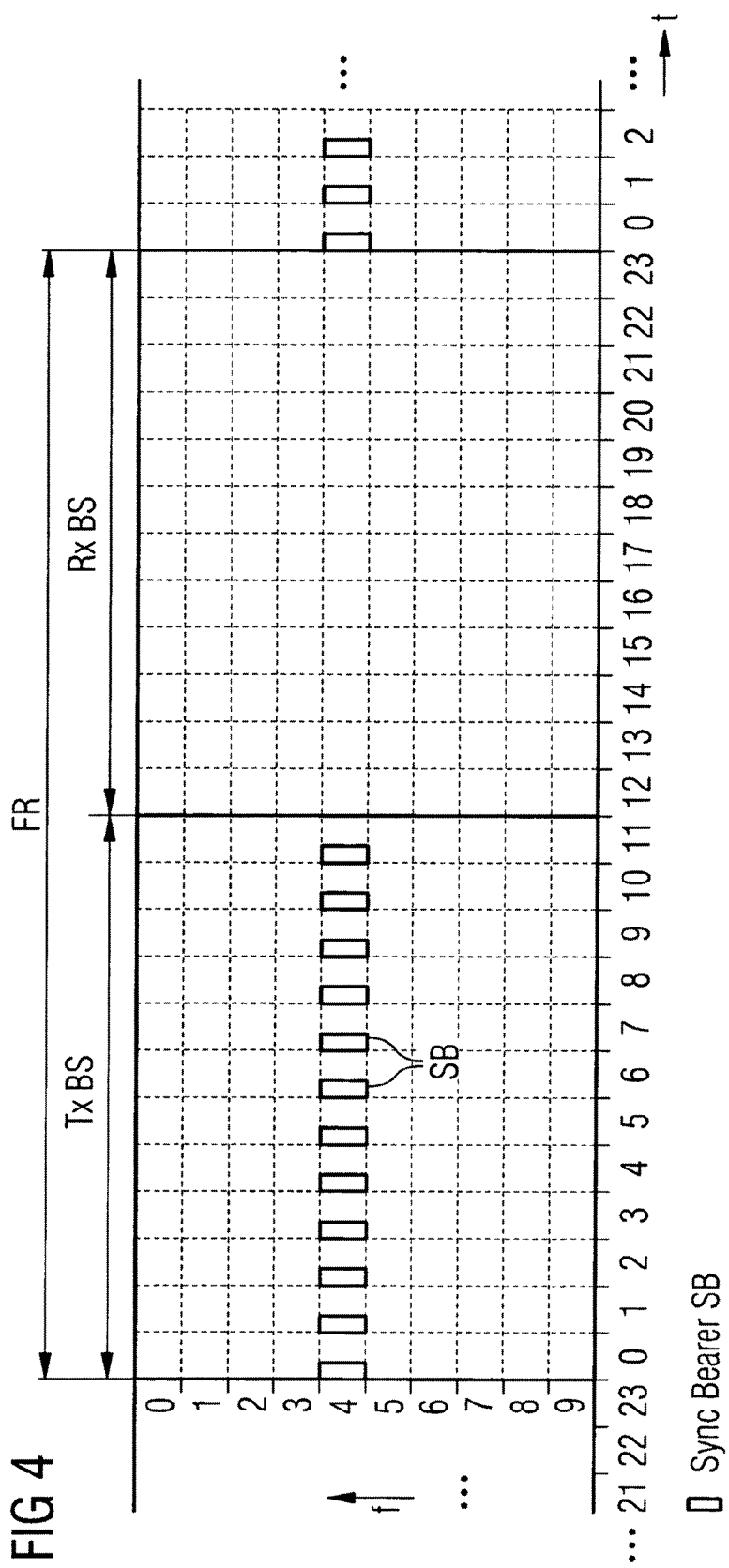

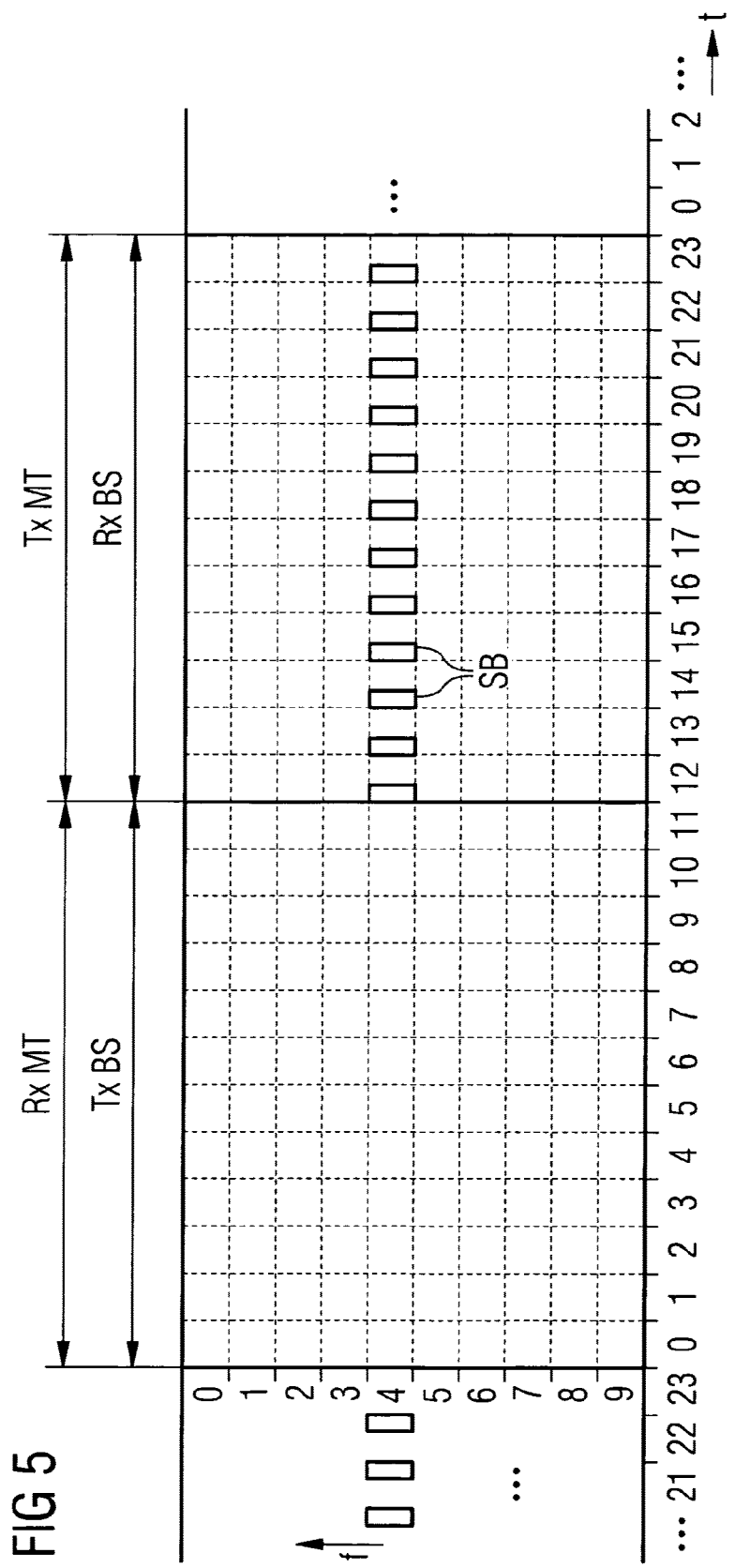

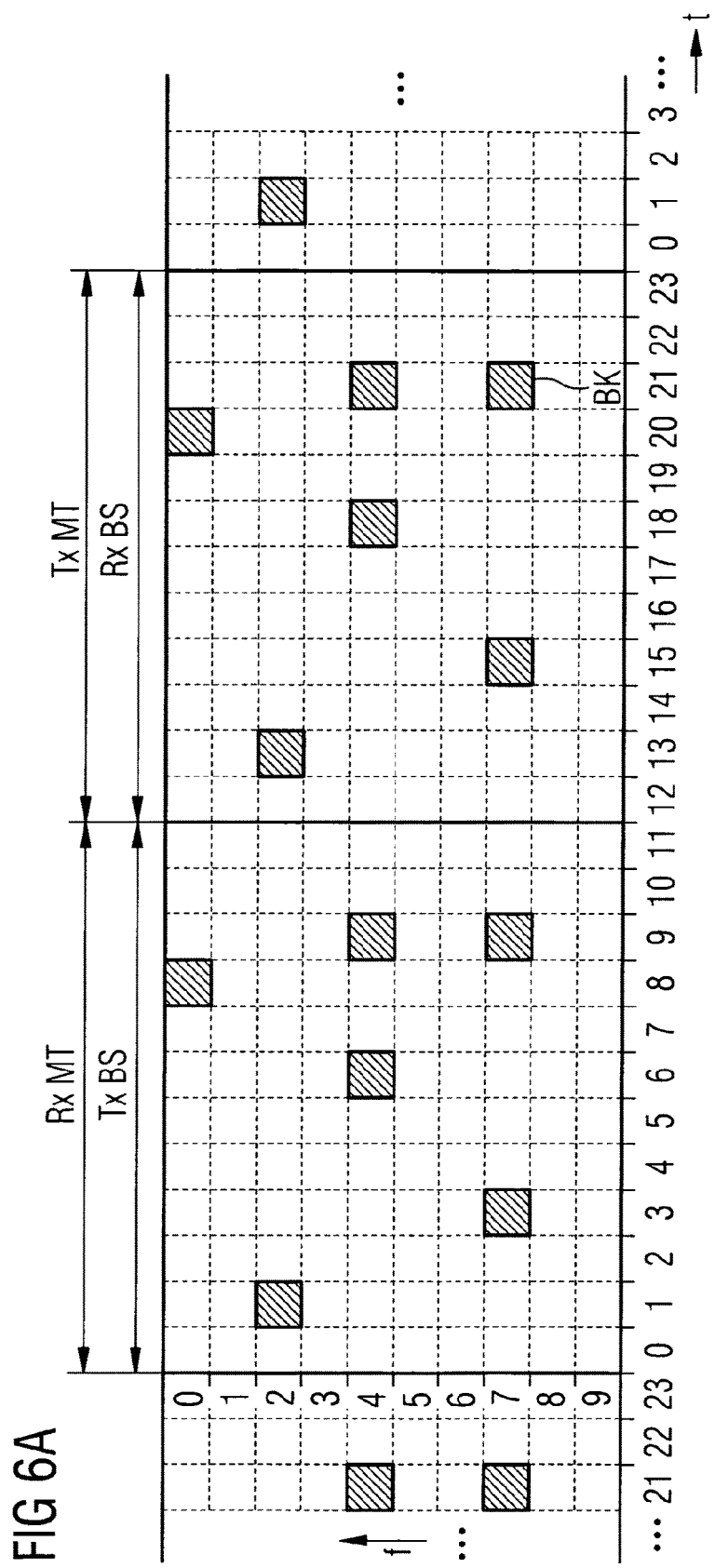

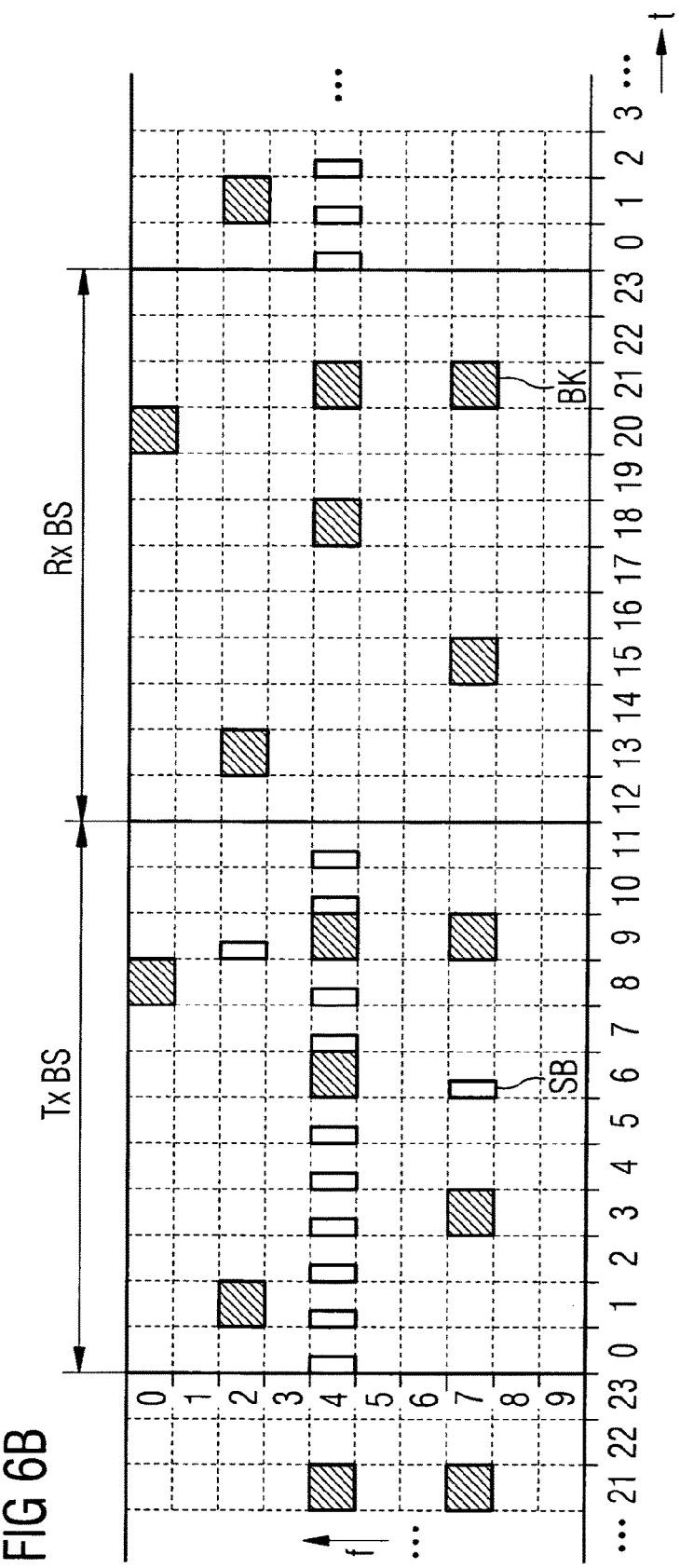

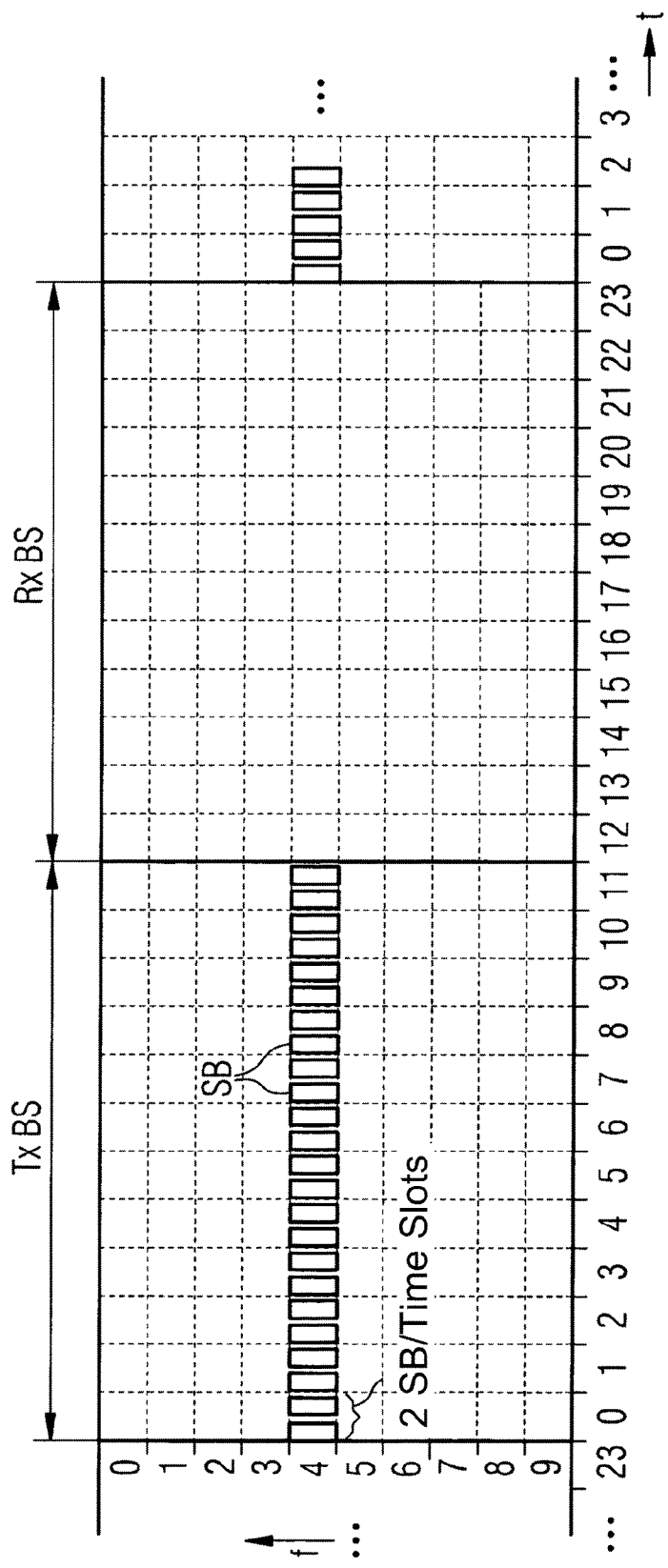

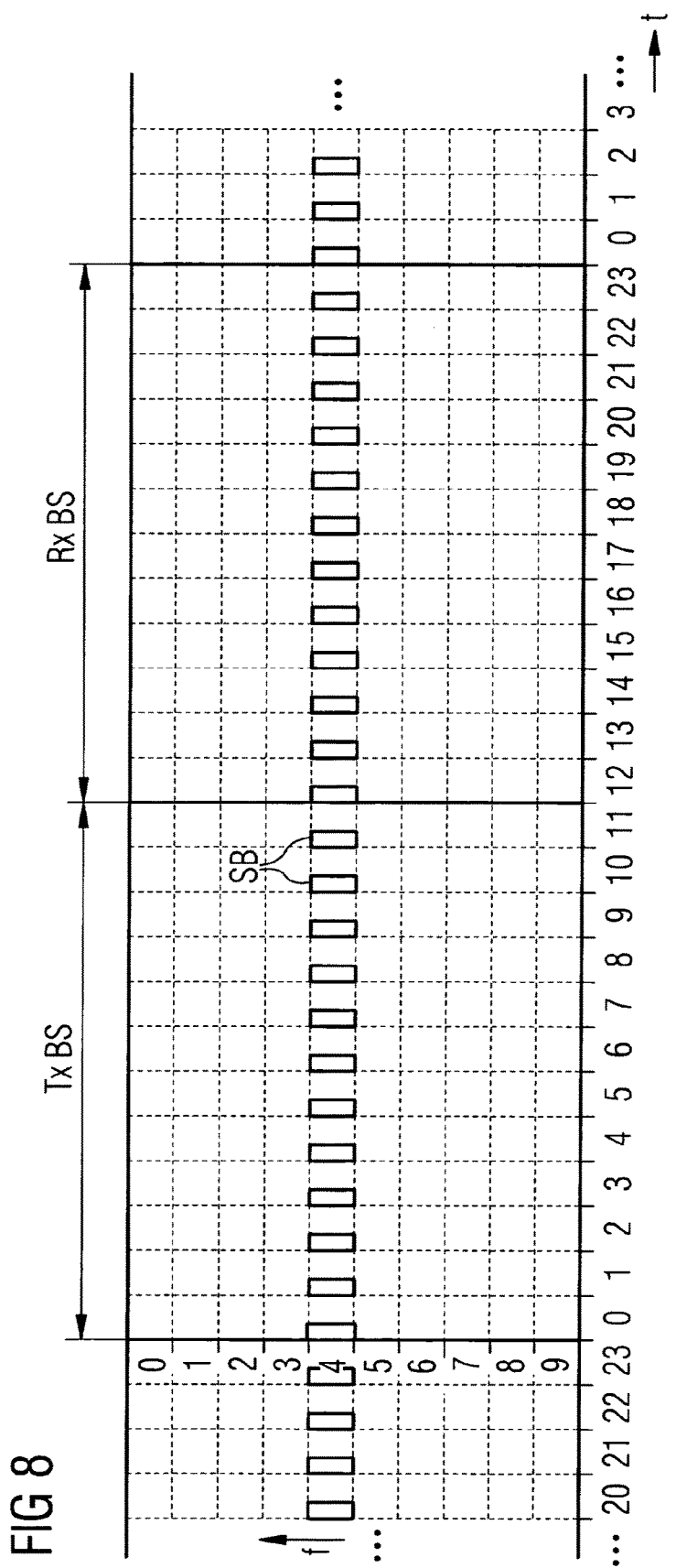

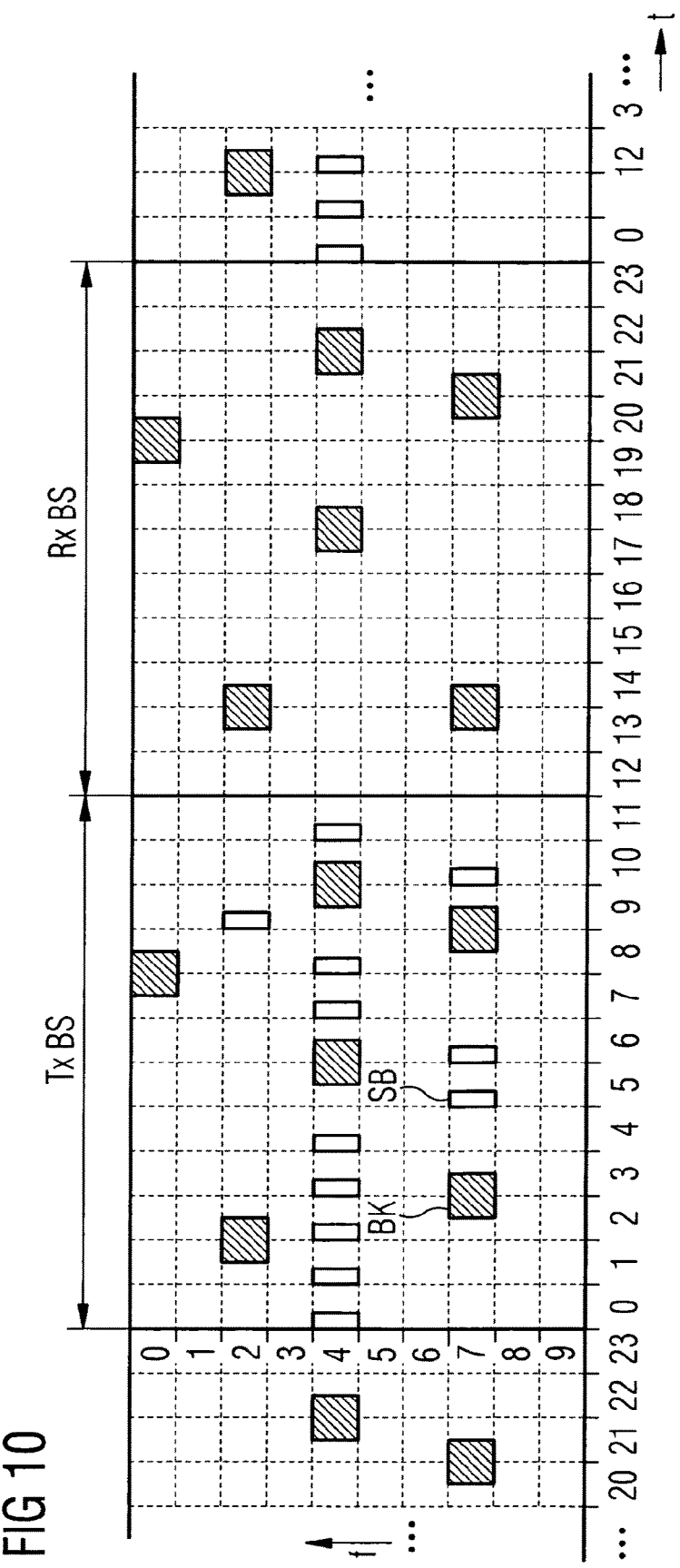

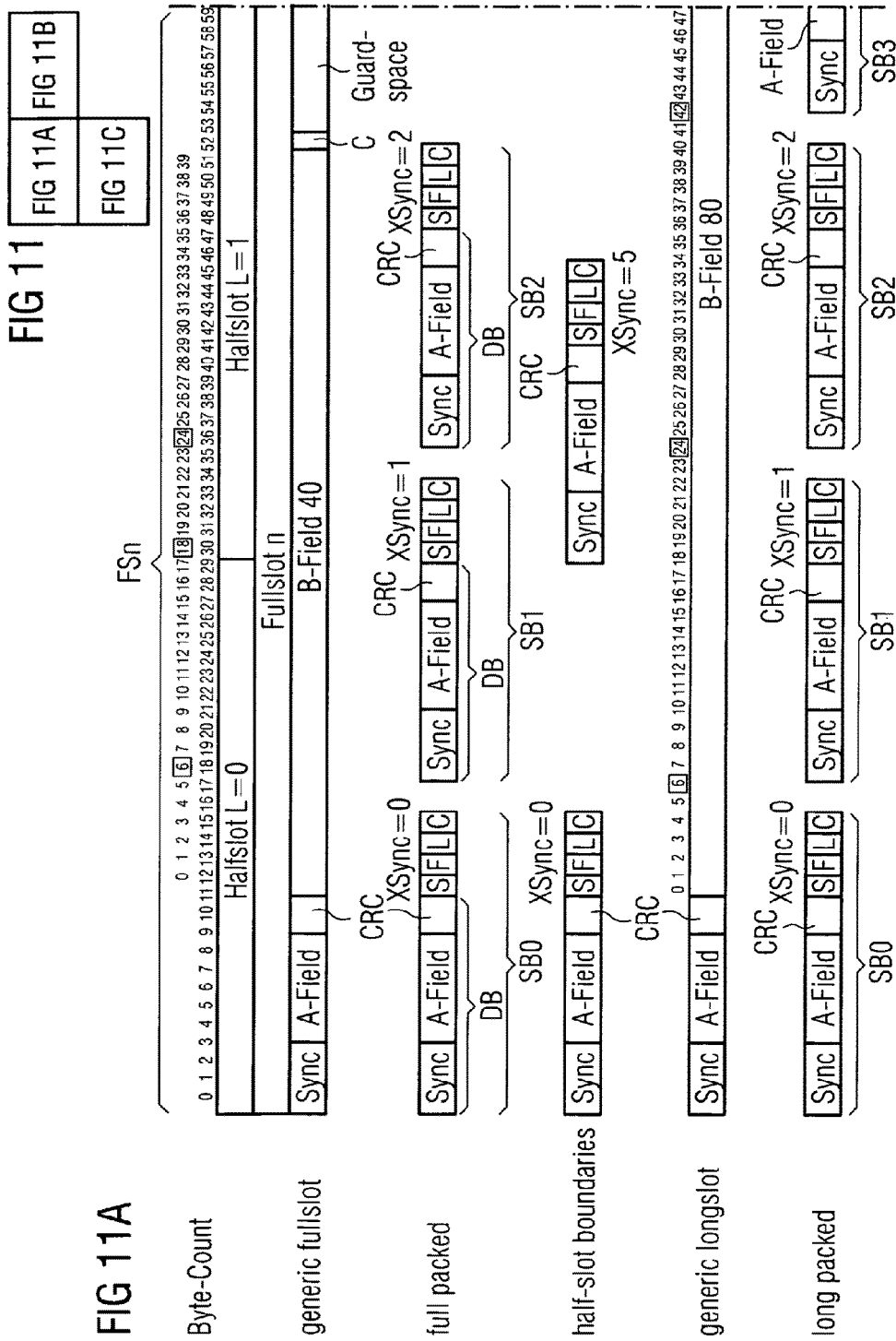

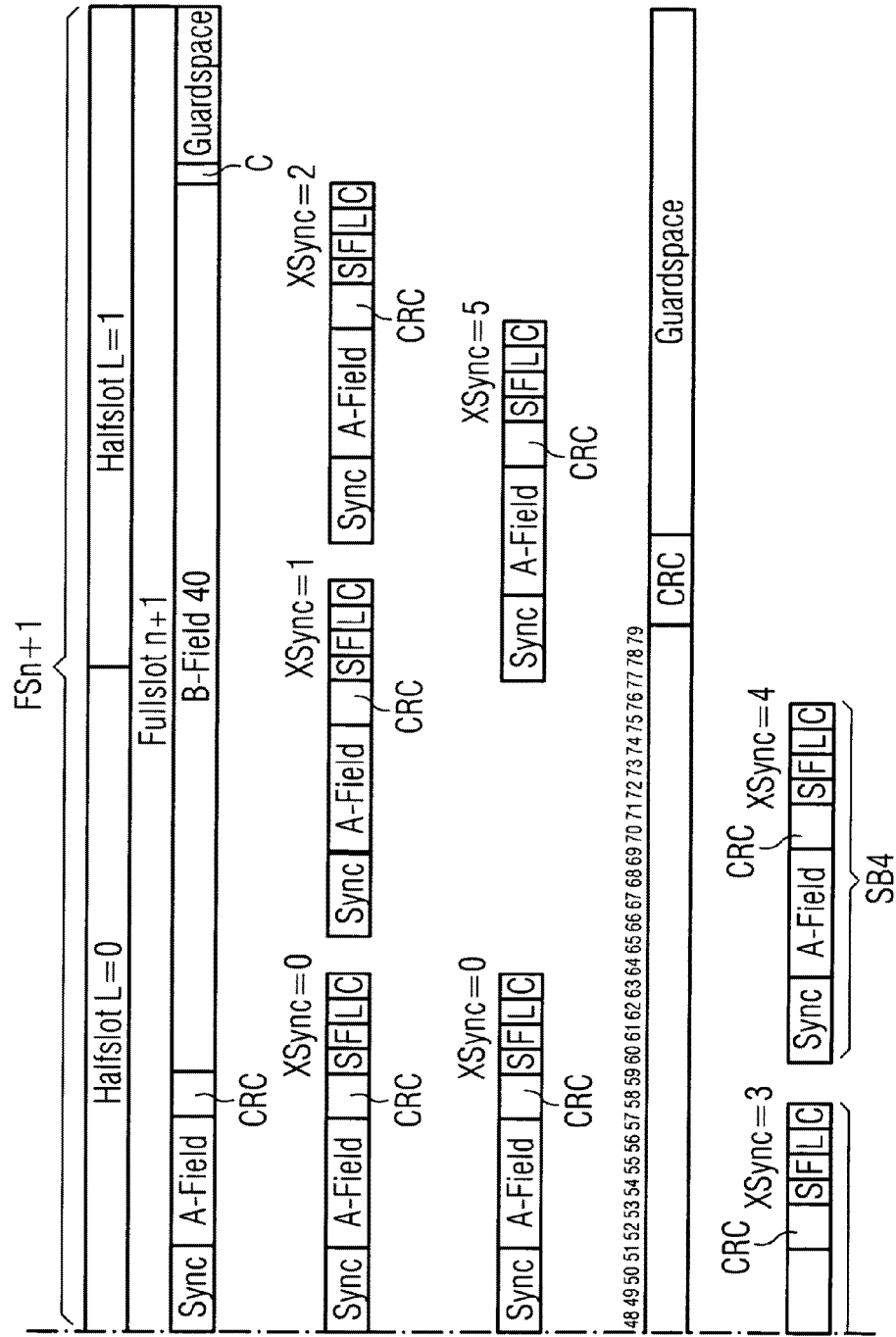

FIG 11C

Xsync-Field

| 7 | 6 | 5 | 4 | 3 | 2 | 1 | 0 |
|---|---|---|---|---|---|---|---|
| S-Pos. | | | Slot | | | | |
| 0 | 0 | 0 | | | | | | Synch Field Starts   0 Symbols After F0
| 0 | 0 | 1 | | | | | | Synch Field Starts 144 Symbols After F0
| 0 | 1 | 0 | | | | | | Synch Field Starts 288 Symbols After F0
| 0 | 1 | 1 | | | | | | Synch Field Starts 432 Symbols After F0
| 1 | 0 | 0 | | | | | | Synch Field Starts 568 Symbols After F0
| 1 | 0 | 1 | | | | | | Synch Field Starts 240 Symbols After F0 (Halfslot-boundary)
| 1 | 1 | 0 | | | | | | Reserved
| 1 | 1 | 1 | | | | | | Reserved
| | | | | S | S | S | S | Reference Time Slot-Nr. 0...23

[S]

| PSCN | Framecnt | [F]

| Freq | Slot | [L]  Lock-Bearer-Position, at which normal "Dummy Bearer" can be found

| Checksum | [C]

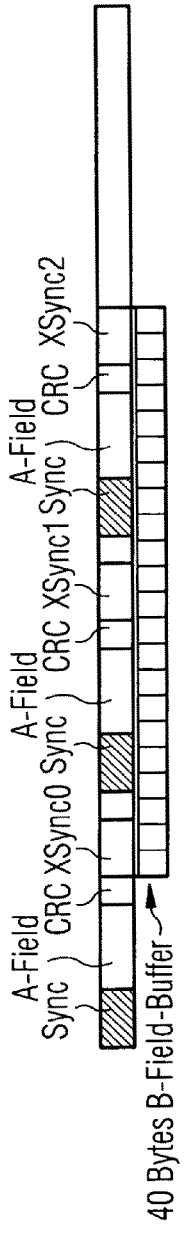
FIG 11D  Configuration of sync segments with Maximum occupation of B-fields
40 Bytes B-Field-Buffer
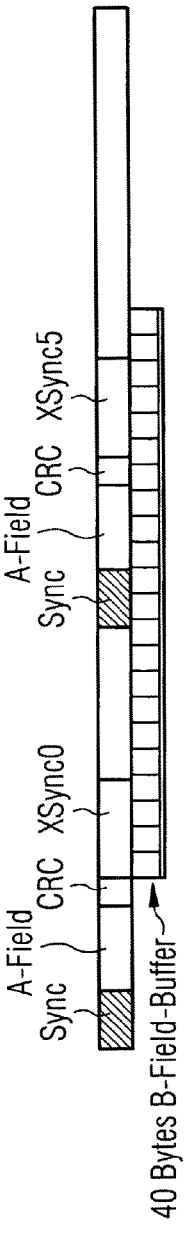
FIG 11E  Configuration of sync segments oriented at half-slot divisions
40 Bytes B-Field-Buffer
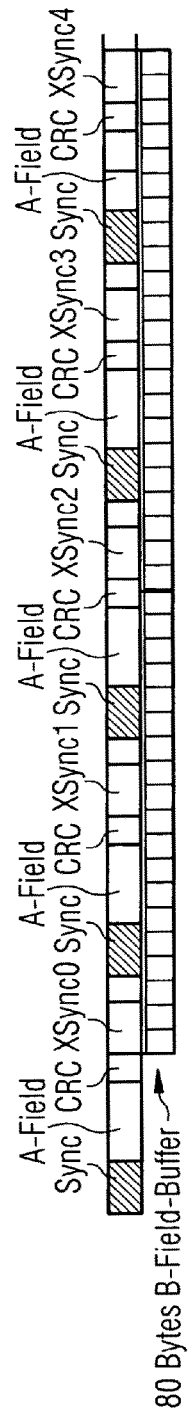
FIG 11F  Configuration of 5 sync segments in a long time slot
80 Bytes B-Field-Buffer

FIG 12  Sync window of Base Station
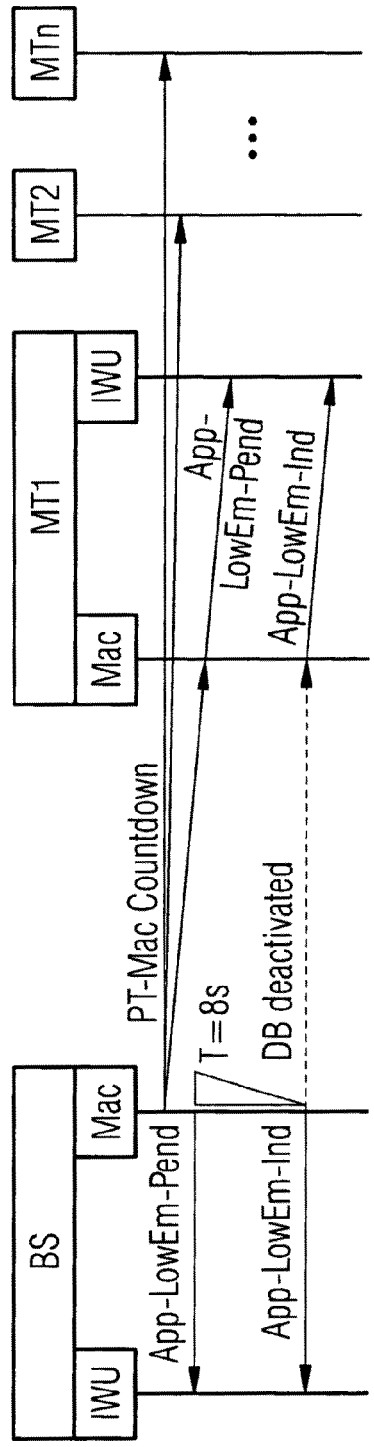
FIG 13A  Successful Activation of Low Emission Mode:

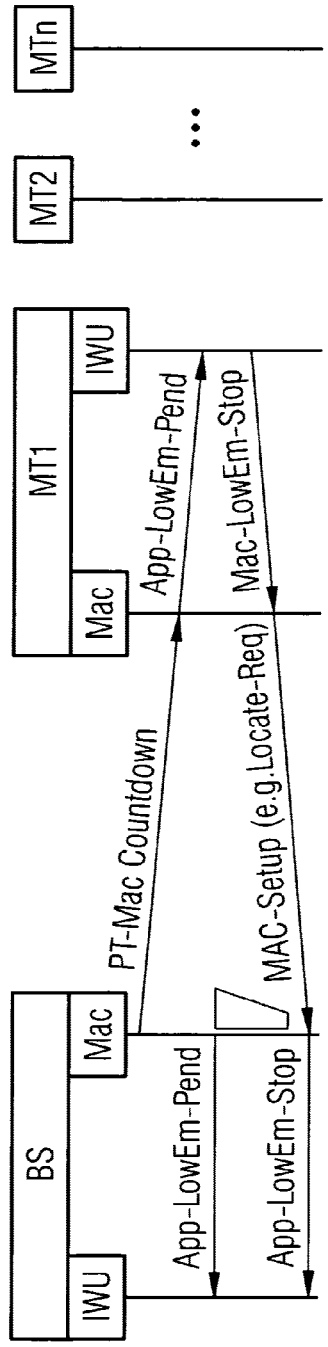
FIG 13B Low-emission-Interrupt by Mobile Component
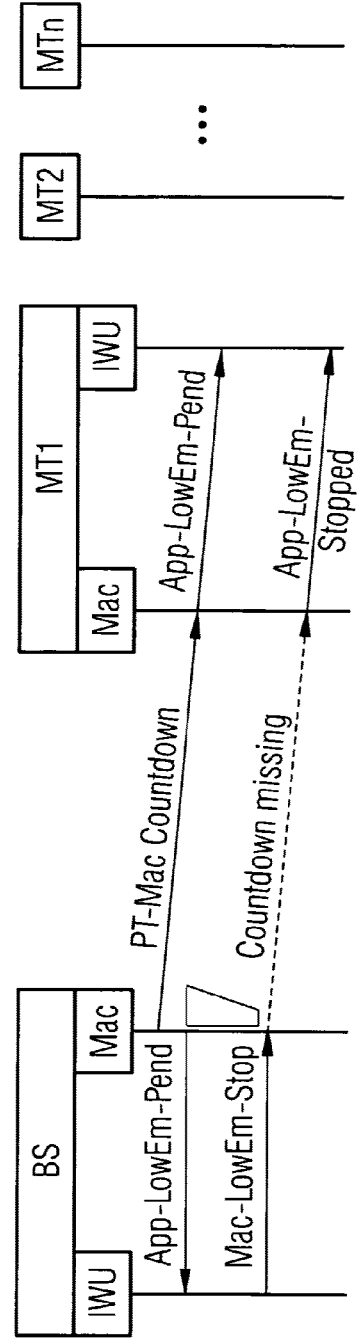
FIG 13C Low-emission Interrupt by Base-Station

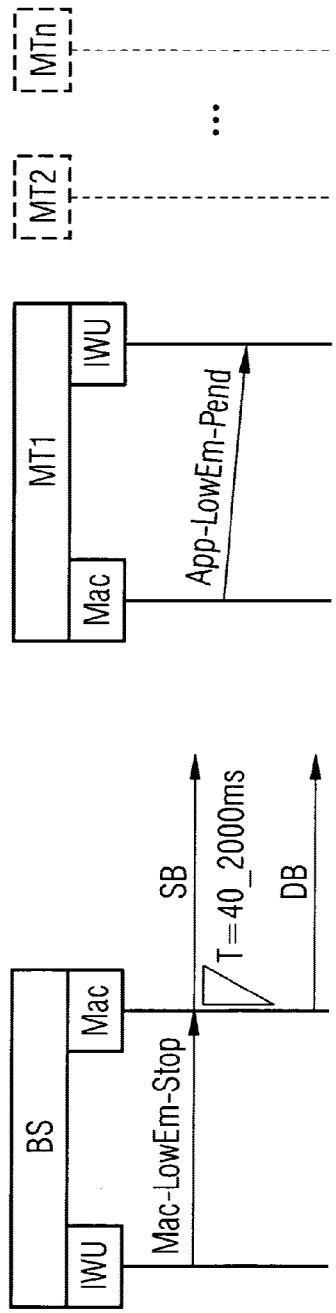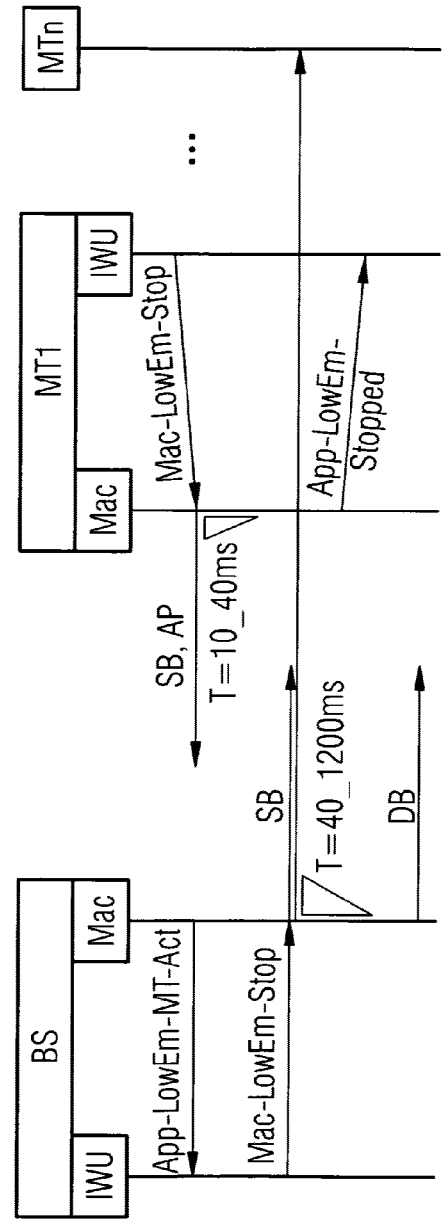
FIG 14
FIG 15

DEVICE AND METHOD FOR CONTROLLING THE CREATION OF A USER CHANNEL CONNECTION IN A COMMUNICATION SYSTEM AND ASSOCIATED COMMUNICATION SYSTEM, DIGITAL STORAGE MEDIUM, COMPUTER PROGRAM PRODUCT, AND COMPUTER PROGRAM

RELATED APPLICATIONS

This application is a National Stage of and claims priority to International Application No. PCT/EP2008/053072, filed on Mar. 14, 2008, and claims the benefit of European Application No. 07005479.6, filed Mar. 16, 2007, both of which are incorporated by reference in their entirety.

FIELD OF THE INVENTION

The present invention relates to a device and a method for controlling the establishment of a user channel connection in a communication system with wireless communication, and in particular to a device and a method for controlling the establishment of a synchronous user channel connection from an asynchronous idle mode in a DECT communication system

BACKGROUND OF THE INVENTION

In conventional communication systems, the DECT standard (digital enhanced cordless telecommunication), for example, a rapid call setup requires permanent synchronization of mobile components with a base station (fixed component). In this instance, what are referred to as "dummy bearers" are transmitted by the base station, or fixed component, as synchronization pulses even when no messages are being exchanged.

Every 10 milliseconds a DECT base station transmits a so-called dummy bearer as a synchronization pulse. At the proper times, here, all mobile components belonging to this base station switch to receive to synchronize themselves with the base station. The interval for a mobile component in which the receiver remains disabled may be as long as 640 milliseconds. The mobile component listens selectively here to determine whether a connection is being requested. The method is highly energy efficient for the mobile component, since in the idle mode it has to switch to receive for approx 100 microseconds only every 640 milliseconds. A drawback here, however, consists in the fact that the base station is continuously transmitting the dummy bearer as synchronization pulse every 10 milliseconds, even when no messages are being exchanged.

FIG. 1 shows a conventional communication system in accordance with the current DECT standard wherein a base station BS is connected to a communication network N. The communication network N can be, for example, a circuit-switched and/or a packet-switched communication network such as, for example, the Internet. FIG. 1 also shows two mobile components MT1, MT2 located within range of the base station BS, which can establish user channel connections via a wireless, or air, interface.

In conventional communication systems, asynchronous mobile components synchronize themselves with the synchronization pulse, or dummy bearer, of the base station, for example, when from outside the range of the DECT cell they come back within range or are reenabled. It is known empirically that this can take many tens of seconds.

The reason for this is made clear by FIG. 2, which shows the possible locations of a conventional synchronization pulse, or dummy bearer DB, at ten available carrier frequencies f as well as the time scanning of a segment, or time frame (frame FR) in 24 time slots FS. According to FIG. 2, the first twelve time slots are used for transmission by the base station BS (transmission time slots TX_BS) and the last twelve time slots FS with ascending numbering for receiving by the base station (reception time slots RX_BS). The situation is precisely the other way around for the mobile components MT. The first twelve time slots will therefore also be designated as reception time slots RX_MT, the second twelve time slots as transmission time slots TX_MT for the mobile components.

Since the mobile component MT disposes of no initial information concerning the transmitting position of the base station BS, it must also search for the receiving times RX_BS of the base station BS at the same time. Basically, each of the six connections, or occupied channels BK, as well as the much shorter dummy bearers, comes into consideration for possible synchronization. So a connection must not only be found, it must also be checked to see if the transmission originates from the requested base station BS. Information is also transmitted on the dummy bearer DB which is important to the operation of the mobile component, such as, e.g., available services, encryption, available frequencies, etc. Once it has found the base, the mobile component needs approximately another 500 ms to collect all information about the system which will be required to establish a connection.

The amount of time required here is not acceptable when, in an idle state, the asynchronous mode is the rule. Before each conversation it would now be necessary to wait for the synchronization, which in the case of the conventional devices and methods takes too long.

The standby time for a mobile component is another reason. It is initially not known to an asynchronous mobile component MT where, in the time/frequency grid according to FIG. 2, the base station BS is going to establish contact with it. To find the dummy bearer DB, the mobile component must permanently scan the entire signal space with its receiver. The power supply in the battery, however, permits only a very short time. Today's standby times of several days will therefore be excluded, since if the receiver is continuously enabled the charge in the battery will last only a few hours. In the case of conventional mobile components and/or base stations, of the Gigaset type, for example, there are currently three different power-down modes:

Green DECT Mode:

Under certain conditions, the base station BS will cut its transmitting power to a lower value. The receiver-scanning slots will also be reduced to a lower value.

The primary rationale behind the idea of going to this operating mode was to achieve an overall reduction in network power consumption by the base station. Lower power consumption in this case was in fact more of a welcome by-product, although it was not explicitly promoted. Transmission power reduction has produced its effect only if certain requirements have been met:

One and only one mobile component has been logged on to the base station.

This mobile component and this mobile component only has been placed in the charging cradle and has successfully identified itself to the base station via the charging contacts.

This mode therefore finds application only at base stations with a charging cradle.

ECO Mode:

This is a static setting at which transmitting power is cut systemwide (base station and mobile component/mobile components). The user enables this setting by menu, and it remains valid permanently. Transmitting power will from then on never be increased, even in the case of bad connections. The ECO mode state is shown on the display.

The ECO and green DECT modes can be used independently in combination. In green DECT mode a somewhat lower transmitting power can be selected than in ECO mode.

Low Transmitting Power in Mobile Component:

Conventional mobile components, such as the GIGASET 2000C for example, have recently appeared, which on the basis of reception quality and signal strength decide whether transmitting power can be decreased. Transmitting power will then be decreased in the mobile component but not in the base station. Subsequently it can be switched back to high transmitting power during a call, the switching being handled technically during a handover. At the beginning of a connection the system will operate at high transmission power.

It is also known that the base station transmits a reduced-power dummy bearer. But this still doesn't solve the basic problem, that is, how to dispense with synchronization pulses, or dummy bearers, altogether during idle periods, e.g., at night. Current solutions work only if a single mobile component is logged onto the system and, as described above, this component remains in the charging cradle at the base station.

SUMMARY OF INVENTION

The object of the invention, therefore, is to propose devices and a method for controlling the establishment of a user channel connection in a communication system as well as an associated communication system, digital storage medium, computer program product and computer program, which can rapidly establish a user channel connection in response to a connection request communicated by the mobile component or base station for the purpose of transmitting user data, and at the same time eliminate the transmission of synchronization pulses in idle mode.

According to the invention, with respect to the devices this object is achieved by virtue of the features described in patent claims 1 and 15, with respect to the method by virtue of the operations described in patent claims 8 and 27, with respect to the communication system by virtue of patent claim 43, with respect to the digital storage medium by virtue of patent claim 44, with respect to the computer program product by virtue of patent claim 45 and with respect to the computer program by virtue of patent claim 46.

Particularly by using a processing unit to analyze synchronization pulses with amplified synchronization information, which gives information concerning the location of the synchronization pulse within the time frame, analyzing the location information, and then by controlling a transmission unit so as to establish a synchronous user channel connection on the basis of the analysis results, it becomes possible to establish a user channel connection more rapidly from an asynchronous idle mode.

A faster wake-up procedure can also be implemented by a processing unit which as analysis results generates synchronization requests if a local connection request has been received or the receiving unit receives at least one interrogation pulse per time frame, when the interrogation pulse contains no amplified synchronization information, and at its end, the control unit controls the transmitting unit such that it transmits at least two synchronization pulses per time frame.

Such a wakeup signal detection procedure is preferably implemented in the base station, although, basically, it could also be implemented in the mobile components.

So the concept constituting the basis of the invention consists in that, to establish a synchronous user channel connection from an asynchronous idle state, an initiating device of a communication system (e.g., in the case of incoming calls: base station/fixed component; in the case of outgoing calls: mobile component) will transmit synchronization pulses to all available physical resources (e.g., at all frequencies in the frequency/time range and at all possible times). This would also mean, for example, multiple pulses within time slots, which primarily would be either transmission time slots or receiving time slots. The large number of synchronization pulses transmitted and available will ensure rapid synchronization because it sufficiently increases the probability that a pulse will fall within the search window of a receiver. Furthermore, preferably within a DECT system, one or more preferred frequencies for establishing connections can be agreed upon, which could derived, for example, from a base station identification, such as, for example, the radio fixed part identity (RFPI).

This offers the advantages that there will be no transmissions during idle modes, rather only upon reception of requests for connection to transmit user data; there is no limitation on range; there is no limit on the number of mobile components in the system; there is no need for the receiving unit (receiver) to operation continuously (increase in standby time); synchronization times will be short; and a mode compatible with previous systems operating, for example, in accordance with the DECT standard is possible.

Other features described below characterize other useful embodiments of the invention.

BRIEF DESCRIPTION OF THE DRAWINGS

The invention is described in greater detail here on the basis of embodiment with reference to the diagram.

Diagrams Show the Following:

FIG. 1 a simplified block diagram of a conventional communication system with wireless interface;

FIG. 2 a simplified diagram to illustrate occupied channels and dummy bearers in a time/frequency range according to the state of the art;

FIG. 3 a simplified diagram of a device for controlling the establishment of a user channel connection as it can be implemented in a mobile component and a base station;

FIG. 4 a simplified diagram of a time/frequency range according to a first exemplary embodiment;

FIG. 5 a simplified diagram of a time/frequency range according to a second exemplary embodiment;

FIGS. 6A and 6B simplified diagrams of time/frequency ranges according to a third exemplary embodiment;

FIG. 7 a simplified diagram of a time/frequency range according to a fourth exemplary embodiment;

FIG. 8 a simplified diagram of a time/frequency range according to a fifth exemplary embodiment;

FIG. 10 a simplified diagram of a time/frequency range according to a seventh exemplary embodiment;

FIGS. 11A to 11C detail diagrams of synchronization formats according to the invention;

FIGS. 11D to 11F simplified diagrams of FIG. 11A to 11C;

FIG. 12 a simplified diagram of a reception time window of a base station containing interrogation pulse from a mobile component;

FIG. 13A a simplified state diagram to illustrate the enabling of an idle mode;

FIG. 13B a simplified state diagram to illustrate an idle-mode interrupt by a mobile component;

FIG. 13C a simplified state diagram to illustrate an idle-mode interrupt by a base station;

FIG. 14 a simplified state diagram to illustrate a synchronization operation by the base station; and FIG. 15 a simplified state diagram to illustrate a synchronization operation by a mobile component.

DETAILED DESCRIPTION OF THE INVENTION

Figure 9:
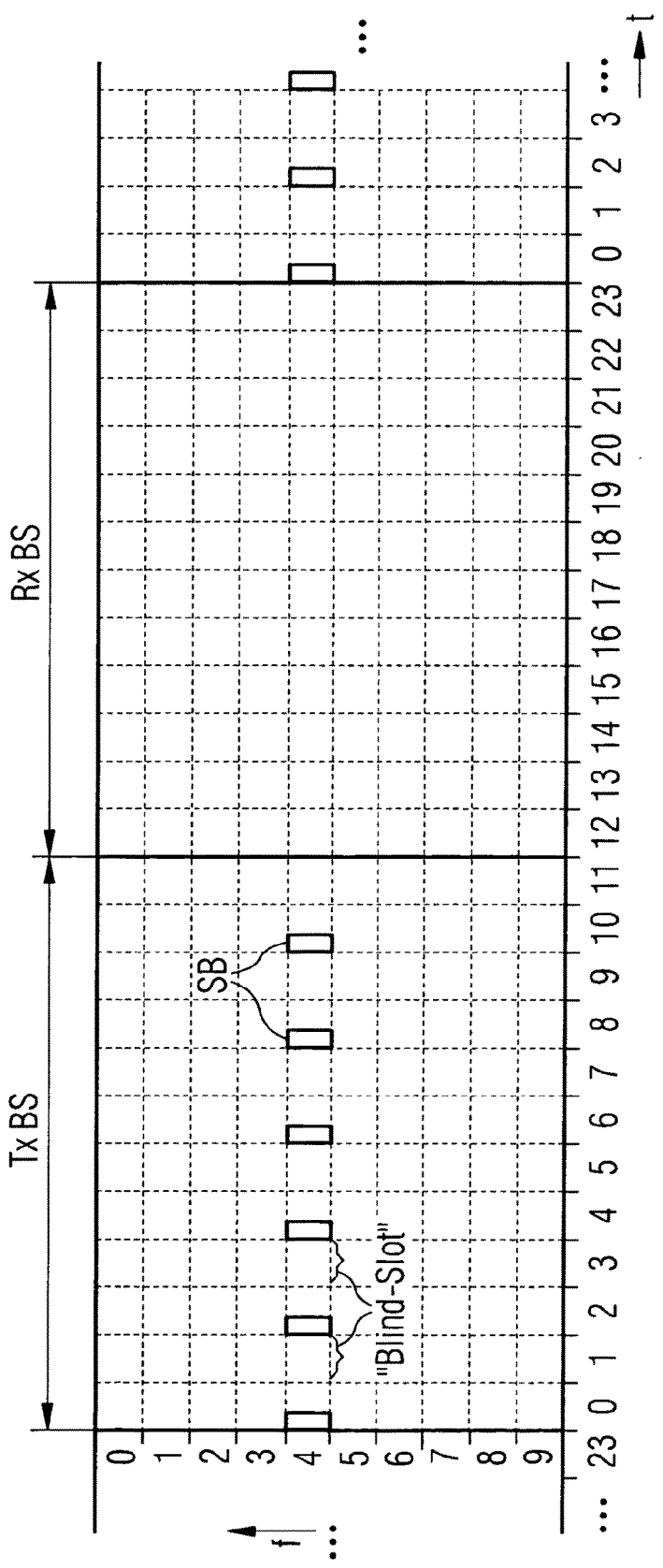
FIG. 9 a simplified diagram of a time/frequency range according to a sixth exemplary embodiment.

The present invention focuses on devices and methods for implementing a digital communication system which dispenses with continuous transmission of pulsed radiation in the form of a periodic dummy bearer DB for synchronization in idle mode. "Idle mode" here means that no user data (voice and/or packet data) is being transmitted to and from mobile components via the fixed component, or base station.

The present invention will be described below with reference to the example of a DECT communication system. If in such a DECT system the dummy bearer DB is disabled, the rapid response, i.e., response time $t_r<1$ s, of a mobile component, to an incoming or outgoing call for example, is not given. A mobile component takes too long to exit the asynchronous mode (approx 10 seconds) to synchronize itself to the base station.

The present invention permits rapid synchronization for TDMA systems (time division multiple access), DECT for example, that can be implemented with available technology and with thorough compliance with the current standard (e.g., taking occupied channels into consideration). It obviates any need for periodic, contenuously transmitted dummy bearers DB, especially in idle mode, as well as the continuous operation of the receiver in the mobile components, so transmitting power can be used exclusively for transmissions and the selective establishment of connections.

FIG. 3 is a simplified block diagram of a device for controlling the establishment of a user channel connection such as can be implemented in a communication system, a mobile component MT as well as a base station BS. According to FIG. 3, the device 10 consists of a receiving unit 1 for receiving input signals SB or AP on the wireless interface, or air interface, of the communication system, which will preferably be specified in accordance with the DECT standard. The input signals can have, in particular, a synchronization pulse SB or an interrogation pulse AP. A processor unit serves to detect and analyze input signals received from the receiver unit 1 to generate a corresponding analysis result AE. The analysis result AE is fed to a control unit 4, which is designed to control the transmitting unit 3 in response to the analysis result AE.

According to the invention, the processor 2 can detect, e.g., the synchronization pulse SB received via the receiver unit 1, which carries amplified synchronization information XSync, which gives location information S relating to the synchronization pulse SB within the time frame FR, and analyzes the location information S. And then, on the basis of the analysis result AE, or the analyzed location information, the control unit 4 can control the transmitting unit 3 in a manner permitting the establishment of a synchronous user channel connection with a remote location (e.g., mobile component or base station).

FIGS. 11A and 11B are detail diagrams of a frame configuration for corresponding input signals received by the receiving unit 1. This would be a synchronization pulse SB with amplified synchronization information XSync from a conventional dummy bearer DB with a synchronization field SYNC, an A field and a CRC field. The amplified synchronization information XSync here comprises location, or position, information S; scrambler information F, dummy bearer information L and a checksum C.

According to FIG. 11C, the location, or position, information S includes three bits which define the synchronization pulse SB within a time slot FS and an additional time-slot information slot giving the number of the time slot containing the synchronization pulse SB. Analysis of this location information S will therefore permit unambiguous determination of the location of the synchronization pulse SB within a time frame FR and, therefore, the establishment of a synchronous user channel connection over the wireless interface at the earliest possible time.

The optional scrambler information F includes, for example, transmission frequency information PSCN giving the frequency a base station is currently using and an associated frame counter framecnt giving a corresponding frame. Since data is ordinarily transmitted in a disordered, or scrambled, form, this scrambler information F permits reliable descrambling of scrambled data.

Furthermore, the amplified synchronization information XSync and dummy bearer information L with frequency frec and time-slot slot indicators can be analyzed to indicate where within a time/frequency range a normal dummy bearer DB is located at any given moment.

In this way, the transition from an asynchronous idle mode to the establishment of a synchronous user channel connection can be implemented very quickly.

The device and associated method described above can be implemented in both a base station BS and a mobile component.

Alternatively, a synchronization pulse SB without amplified synchronization information XSync can also be used as an interrogation pulse AP, or wake-up signal, such implementations preferably being implemented in the base station BS. According to FIG. 3, the processing unit 2 will then transmit, as analysis result AE, a synchronization request to the control unit 4 if either a local connection request LV is pending at the base station BS or the receiving unit 1 receives at least one interrogation pulse AP, corresponding, for example, to a truncated synchronization pulse SB without amplified synchronization information XSync, per time frame FR. In this instance, the control unit 4 controls the transmitting unit 3 such that, as illustrated in FIGS. 11A to 11E, at least two synchronization pulses per time frame FR will then be transmitted via the wireless interface. This then makes it easy for, in particular, a mobile component MT to awaken a base station BS and quickly begin to supply it with synchronization pulses SB for rapid synchronization.

Although this implementation procedure is preferably implemented by a base station, it is basically also possible for it to be implemented by a mobile component as well, when the base station would first synchronize itself to the mobile component.

The rapid synchronization method according to the invention is described in basic terms below as, for example, it can be implemented as a rapid DECT synchronization method.

FIG. 4 is a simplified diagram of a time/frequency range designed to illustrate rapid synchronization according to a first exemplary embodiment, where the same reference keys define the same components as in FIG. 2, which makes it possible to dispense with repeated descriptions below.

It will be assumed, for example, that the base station BS synchronizes the mobile component MT. According to the invention, the mobile component MT is initially in the asynchronous idle mode, in which, as previously in the synchronous mode, it enables its receiver, or receiving unit 1, only every 640 milliseconds. If a connection is requested, the base station BS will now transmit not simply a single dummy bearer DB per time frame FR, but rather, as FIG. 4 makes clear, as many as it possibly can. According to FIG. 4, for example, a dummy bearer will therefore be transmitted as a synchronization pulse SB at frequency f=4 in every transmission time slot TX_BS of the base station. Ordinarily, the other free positions in the time/frequency range cannot be used, since, as a rule, a device will always have only one synthesizer and so cannot enable two different frequencies simultaneously.

In the exemplary embodiment proposed in FIG. 4, every transmission time slot FS0 to FS11 has, in fact, so far been used, but only one of 10 possible frequencies (f=4). To keep a base station BS and a mobile component MT from passing one another too long on different frequencies in this situation, a preferred frequency should be agreed upon within a communication system. As opposed to a specified service channel, any one of the 10 frequencies of a base station can be selected as the preferred frequency. Both random algorithms, e.g., at the base station, the RFPI (radio fixed part identification), which is different for each base station, and measurements of current channel occupancy on the basis of the RSSI signal (received signal strength indication) for the base station would come into consideration here.

Synchronization pulses SB would then be transmitted at this agreed upon preferred frequency. When a mobile component enables its receiving unit 1, it will immediately find a usable synchronization pulse SB and so can establish contact in the next reception time slot RX_BS of the base station. In FIG. 4, for example, the preferred frequency is f=4.

FIG. 5 is a simplified diagram of a time/frequency range for implementing a rapid synchronization in accordance with the second exemplary embodiment. According to FIG. 5, the mobile component MT can also synchronize the base station BS. An important difference as compared with the exemplary embodiment according to FIG. 4 consists in the fact that not only can the mobile component synchronize itself with the base station, but the base station can also synchronize itself with the mobile component. This situation can always arise when a call is transmitted from an asynchronous mobile component MT. If, for example, the mobile component begins to generate as many synchronization SB or interrogation AP pulses within a time frame FR as its system configuration permits. The base station, which initially can also be asynchronously in idle mode, will periodically enable its receiving unit 1, like a mobile component in the first exemplary embodiment. On the other hand, a base station BS can also leave its receiving unit continuously enabled, since as a rule it will be supplied from the power grid and so not be subject to the same power limitations as a mobile component.

The mobile component MT will have the same transmission configuration as the base station BS in FIG. 4. The base station BS detects the connection request and either synchronizes itself with the synchronization pulses SB of the mobile component or, upon reception of interrogation pulses AP, transmits synchronization pulses SB from its end. The synchronization thus found can then be maintained. Alternatively, the base station can also selectively bring the mobile component over to its own synchronization if it has to maintain more than one connection with other mobile components.

Since, because of the duality associated with the establishment of connections, there are hardly any differences between base station and mobile component, only the synchronization of the mobile component with the base station will be illustrated in detail below. Possible variations (e.g., base station on power grid) will be dealt with separately.

FIGS. 6A and 6B are simplified diagrams of time/frequency ranges for illustrating rapid synchronization according to a third exemplary embodiment. The foregoing exemplary embodiments have assumed a communication system within whose range there is no other communication system (e.g., another DECT system). If there are other communication systems, one or multiple time slots FS can be occupied, particularly at the selected preferred frequency f=4 as well. In FIG. 6A, for example, at the preferred frequency f=4, time slots 6, 9, 18 and 21 are blocked by occupied channels BK. Channel occupancy can determine the device establishing the connection, e.g., on the basis of RSSI measurements. Any particular channel occupancy here can be determined immediately before the establishment of a connection. The base station can measure continuously, primarily by virtue of its power grid supply.

During time occupied by other communication systems, the synchronizing system can switch to other frequencies. This is illustrated in FIG. 6B. Only with occupation of the first alternate frequency as well can any third frequency be selected. Alternatively, a rank ordering of alternate frequencies can be maintained. In FIG. 6B, for example, the establishment of a connection is initially begun at preferred frequency f=4. But time slots 6 and 9 are already occupied. So with the synchronization pulse SB, there is a switch in time slot 6 to a first alternate frequency f=7. In time slot 9, both the preferred frequency, f=4, and the first alternate frequency, f=7, are occupied. So in this case there is a switch to a second alternate frequency, f=2.

FIG. 7 is a simplified diagram of a simplified time/frequency range for illustrating rapid synchronization according to a fourth exemplary embodiment. The transmission of a synchronization pulse SB, for example, lasts approx 96 microseconds. This only a fraction of the transmission time of a DECT "burst" (DECT transmission pulse of approx 368 microseconds). This permits the transmission of at least two synchronization pulses SB in one time slot FS. According to FIG. 7, this would therefore even allow for two or more synchronization pulses SB per time slot FS. The density of the synchronization pulses SB is thereby increased substantially. This again increases the probability that an asynchronous device (mobile component or base station) will immediately find a usable synchronization pulse SB.

In the exemplary embodiment according to FIG. 7, the second synchronization pulse can be identified as such so the receiving device can establish the correct position of the synchronization grid. In FIG. 7 both synchronization pulses are transmitted at the same frequency. The second synchronization pulse, however, can also be transmitted on another frequency. If the current DECT standard burst mask is maintained here, the synthesizer will have approx 122 microseconds of tuning time available for a change.

For example, based on computation alone, it can be seen that a time slot 480 bits long can accommodate precisely 5 dummy bearers DB 96 bits long. Realistically, however, only four synchronization pulses need to be taken into consideration, since run-up time (ramping time, guard space) for the power amplifier at the beginning and at the end also have to be factored in.

Since with such a dense occupancy with, for example, four synchronization pulses, no frequency change is possible, the run-up times between, e.g., the four synchronization pulses will also disappear. A burst of this type differs from a normal DECT burst only in its special modulation.

The different synchronization times may therefore require special approaches. These could take the following forms:
a) Synchronization pulses SB1 to SB4 get a time slot counter. Synchronization then proceeds with reference to the normal DECT grid.
b) The remote site, which is asynchronous anyway, takes the phase of the found dummy bearer DB.
c) More information will be compressed into a synchronization pulse SB. The information required here must be determined here at the MAC level of the DECT protocol stack.

FIG. 8 is a simplified diagram of a time/frequency range for illustrating rapid synchronization according to a fifth exemplary embodiment. An asynchronous mobile component in idle mode, for example, enables its receiver only every 640 milliseconds. So an average of 320 milliseconds, 640 milliseconds in the worst case, elapses before a mobile component MT receives anything at all. A response to the synchronization request during this time, of course, is not going to be anticipated either. The RX time interval of a time frame FR can therefore be used for more synchronization pulses. This increases the probability that an asynchronous device will immediately encounter a usable synchronization pulse. According to FIG. 8, this implementation is shown for a base station BS. This of course holds correspondingly true for a mobile component, excepting only that the TX and RX phases within the time frame are reversed.

According to FIG. 8, a synchronization pulse SB 640 milliseconds long can be transmitted by a device with a connection request in every free and available time slot FS. Since in this case the usual RX phase disappears every 5 milliseconds later, the synchronization pulses SB should be appropriately identified in their data component. On the other hand, one possibility here would be a counter giving the number of synchronization pulses remaining until the first available RX subframe. This enables an asynchronous device to immediately find a usable synchronization pulse SB. It can synchronize itself on it and analyze the counter reading. At the end of 640 milliseconds a now synchronous device can immediately establish the connection.

This also ensures that all devices within a system have a chance sometime during the synchronization phase to find a synchronization pulse. It allows the method to remain independent of the phase in which an asynchronous device will be within its 640-millisecond cycle. In the mobile component, for example, this cycle can also be 1280 ms. Alternatively, without this counter it would also be possible simply to wait for the transition to the normal time frame FR. The individual alternatives described here, of course, can also be implemented in combination.

FIG. 9 is a simplified diagram of a time/frequency range for illustrating rapid synchronization according to a sixth exemplary embodiment. It has so far been assumed that a device can use every time slot FS. In the case of devices with slow synthesizers, however, this is not the case. So for each active RX or TX time slot the preceding time slot may be needed to tune the synthesizer to the required frequency. This preparatory time slot is referred to as the "blind" slot. The device can neither send nor receive here. But for normal telephone operation this constitutes no noticeable limitation. For the synchronization suggested here this means, as illustrated in FIG. 9 with reference to the time diagram for a base station BS, that every other synchronization pulse can disappear.

As compared with a latency period averaging 320 milliseconds which is present anyway, this constitutes no serious drawback. Incidentally, suggestions proposed in the fourth and fifth exemplary embodiments offer compensating alternatives, whereby multiple dummy bearers DB are used in one time slot or are also transmitted in the first RX subframe.

FIG. 10 is a simplified diagram of a time/frequency range for illustrating rapid synchronization according to a seventh exemplary embodiment, wherein adjacent nonsynchronous systems are taken into consideration. The exemplary embodiments described above assume that adjacent communication systems, or DECT systems, also maintain a common time grid among themselves and so will also be synchronized among themselves.

In the case of today's communication systems, however, this is the exception rather than the rule. The systems will ordinarily be asynchronous among themselves and in their time reference drift toward one another.

Since the DECT standard is familiar with collision-detection mechanisms, in this case, another time slot or another frequency will be selected.

For the exemplary embodiment described here this means that, before synchronization, the locations of other communication systems can be detected by RSSI signals. In this case, occupied time slots FS will not be used for synchronization as described above in the exemplary embodiment 3.

According to FIG. 10, however, another time slot can also be disabled, since a time slot of one system can extend over two time slots of another system. According to FIG. 10, this is the case for the occupied channels BK at frequency f=4. So individual synchronization pulses SB will shift to other frequencies (alternate frequencies such as in exemplary embodiment 3).

Specific aspects of rapid synchronization will be described in detail below.

According to the invention, rapid synchronization is achieved in a TDMA system (e.g., DECT) without the need for a permanent dummy bearer in the idle mode. Consideration will be given primarily to the case in which mobile components are within range of the base station but not within range of each other. So if two mobile components are located at opposing ends of the range on opposite sides of the base station BS, as far as synchronization is concerned, the base station BS must also be active. In this case, by means of a second synchronization procedure, the base station can then synchronize those mobile components which are not located within direct range of the mobile component doing the synchronizing. This procedure, described as "catch-up" synchronization, is also referred to as "asymmetric" synchronization, since, unlike the symmetric synchronization described above, it permits of no equality in standing between base station and mobile component in the synchronization process.

In this asymmetric synchronization, therefore, base station and mobile component do not enjoy equality when it comes to the synchronization process, so there will no longer be any need for management of a second synchronization grid in the base station. A mobile component MT with a connection request logs onto the base station with this request. For a limited time, it can also transmit synchronization pulses, referred to as interrogation pulses AP, which contain no amplified synchronization information XSync. Multiple, free, consecutive time slots can also be used, which ensures that the base station finds them quickly. On the other hand, the transmission can also be carried at an agreed-upon preferred frequency.

If the base station detects such a synchronization request, it can initiate the rapid (asymmetrical) synchronization process according to exemplary embodiments illustrated in FIGS. 4 to 10 described above, which relate to symmetrical synchronization. This makes it possible to convert the asymmetrical synchronization process to the symmetrical synchronization process. This asymmetrical approach can also exploit the fact that the base station BS, supplied by the power grid, can enable its receiving unit more frequently and for longer periods of time than a mobile component powered by its battery.

Despite the difference between the asymmetrical synchronization process and the symmetrical synchronization process, as far as rapid synchronization is concerned, it essentially makes no difference whether a base station or a mobile component synchronizes the system for a connection. With the initially asymmetrical synchronization process and then, subsequently, the symmetrical synchronization process, it becomes able to achieve even more rapid synchronization.

The exemplary embodiments described above have generally assumed multiple, but basically at least two, synchronization pulses per time frame FR. To permit differentiation, they can contain an identifier establishing whether a pulse is a first or a second synchronization pulse in the burst, or time frame FR, where, with respect to synchronization, the base station and the mobile component may (symmetrical synchronization) or may not (asymmetrical synchronization) enjoy equal standing.

FIGS. 11A to 11C are detailed diagrams of synchronization pulses which can be used in rapid synchronization, where in each case a byte counter shows the bits for a so-called "full slot" time slot 1FS and a so-called "long-slot" time slot 2FS with their associated synchronization pulses. "Full-packed" here describes maximum occupancy of the B field with synchronization pulses, while "half-slot boundaries" refers to a so-called half-slot configuration. Similarly, "long-packed" refers to a configuration of synchronization pulses in the long time slot (80 bytes in the B field).

The improvement of the strictly symmetrical synchronization method can relate to the three following aspects:

a) Available transmission time is filled with two, three, or, in the case of a long time slot (long slot), with five synchronization pulses SB per time slot. See also the related simplified diagrams according to FIGS. 11D, 11E and 11F, where FIG. 11D shows the configuration of synchronization pulses with maximum occupation, FIG. 11E in the so-called half-slot configuration, and FIG. 11F in a long time slot. In the case of more than two synchronization pulses, these can be generated by a special data pattern within a normal DECT burst alone.

b) Not only one bit in the synchronization pulses SB can be used to differentiate between the first and second synchronization pulses within a DECT time slot FS, but also a counter reading S extending over multiple positions. This makes it possible to precisely compute the position of the synchronization time over multiple time slots FS even if only a single synchronization pulse has been received.

The marker bit will preferably be enlarged to a counter so that a larger time range, such as a full time frame FR, for example, can be covered.

c) The system is synchronized primarily by the base station. So all mobile components within the range of the system will participate. Nor, in this case, can the base station manage two time references. And the time reference will not be switched from the mobile component to the base station if the base station is synchronizing other mobile components. The mobile component MT, for example, can transmit time-limited interrogation pulses AP to the base station. The base station can also analyze these interrogation pulses AP in the asynchronous mode. It detects a connection request from one of its mobile components and then at its end begins the actual synchronization process, i.e., the transmission of synchronization pulses SB, which the mobile component which initiated the interrogation then synchronizes itself with as well.

The basic shift of the synchronization to the base station BS can enable the mobile components to trigger this synchronization process at the base station with short interrogation pulses AP.

According to FIGS. 11A to 11E, a normal DECT time slot can be used for multiple synchronization segments: an amplified synchronization segment, or amplified synchronization field, which comprises amplified synchronization information XSync, is attached to the SYNC, A and CRC fields (SYNChronization, Cyclic Redundancy Check) present at the beginning of every DECT time slot. But the 40-bit-long B field of the time slot FS is still not completely used. One or two more synchronization segments, or synchronization pulses SB, can be accommodated here. The XSync segment here contains information concerning the position within the time slot, or time frame, at which the synchronization pulse SB is locatted.

If a device according to FIG. 11E is using a so-called long-slot format with an 80-bit-long B field, as many as five synchronization pulses SB with amplified synchronization segments XSync can be accommodated.

Table 1 below shows the contents of another synchronization pulse SB, which can be used as an alternative to the synchronization pulse SB shown in FIGS. 11A to 11C.

TABLE 1

|  | SYNC-Field | A-Field + CRC | SYNC-Info | Slot | PSCN | Frame | Multi-Frame | Lock-Channel | Chksum |
|---|---|---|---|---|---|---|---|---|---|
| Bitcount | S0...31 | A0...63 | B0...2 | B3...7 | B8...11 | B12...15 | B16...39 | B40...43 B44...47 | B48...55 |
| Content | AAAAE98A | N-Frame | Position | 0...23 | PSCN | Fr-Cnt | Multi-Frame-No. | Frequency Slot | |
| Byte-count | 0...3 | 4...11 | 12 | | 13 | | 14...16 | 17 | 18 |

According to FIG. 11, increasing the number of synchronization pulses SB, for example, to three, five or six permits optimum use of the available time. In the case of short interrogation pulses AP from the mobile component, more pulses, this time interrogation pulses AP, can be accommodated within a time slot FS.

b) Not only one bit in the synchronization pulses SB can be used to differentiate between the first and second synchro- Here, in bytes 0 to 11, this synchronization pulse SB comprises a conventional synchronization pulse, or dummy bearer DB, to which amplified synchronization information XSync is attached in bytes 12 to 18. In the conventional system, this amplified synchronization information is transmitted in the time multiplex in the A field of a dummy bearer DB. For rapid synchronization, of course, this information must be available immediately.

New in the contents of the synchronization pulse SB according to the invention is the first part S of byte 12, which also gives the location of the synchronization pulse SB within the time slot FS. With the information of this one single synchronization pulse SB, or according to FIGS. 11A to 11C or Table 1, a device can therefore fully establish the synchronicity for the system and assume it as well. Most of the fields in Table 1 are self-explanatory, since the concepts and abbreviations are known from the DECT standard. So only newly defined data fields will be described below.

SYNC Info

Multiple synchronization pulses SB can be accommodated in a full/long slot, where, as time slot-related information, SYNC info gives precisely the position at which within a time slot FS a particular synchronization pulse SB is located.

Lock Channel

The Lock Channel, or dummy bearer information L, gives the location of the normal dummy bearer DB within the time frame FR. The notation corresponds to that also used to "broadcast" the dummy bearer position. So given here will be the corresponding frequency and associated time slot where the normal dummy bearer can be located.

Checksum (chksum)

The checksum C is in fact a soft checksum resulting from an exclusive disjunction of the bytes of the amplified synchronization information XSync (bytes 12 to 17). It should be clear to the receiver that, even with a correct checksum, the data can still contain a transmission error.

TABLE 2

| SYNC-Info B0 ... B2 | Position von s0 im Slot |
|---|---|
| 000 | f0 |
| 001 | f144 |
| 010 | f288 |
| 011 | f432 |
| 100 | f568 |
| 101 | f240 (Half-Slot-boundary) |
| 110 | reserved |
| 111 | reserved |

With the additional Sync information, after receiving only a single burst, the mobile component can establish bit, time slot and time frame synchronicity for the base station BS and position the receiving unit (receiver) such that it uses the lock channel L indicated.

The static characteristics (capabilities) of the base station BS which were assumed in normal synchronization are not additionally transmitted separately. The mobile component can continue to access values already stored.

The base station should not let the synchronization pulse phase last longer than 64 to 128 times frames FR, since the synchronization pulses block potential setup time slots. During this phase at least one time slot should be left open to allow at least one mobile component the chance for a rapid setup. If the synchronization phase lasts longer, setup timer in the mobile component could run out and setup be lost.

As described above, by the symmetrical synchronization method, the device (mobile component or base station) with the first connection request synchronizes the entire system with its time grid. This also includes the case of the synchronization of a base station with a mobile component. As described above, mobile components widely separated from one another pose a problem here. Namely, following an initial synchronization of the base station, the latter must then synchronize the mobile components still unreached.

TABLE 3

|  | SYNC-Field | A-Field + CRC |
|---|---|---|
| Bitcount | S0 ... 31 | A0 ... 63 |
| Content | 55551675 | N-Frame |
| Bytecount | 0 ... 3 | 4 ... 11 |

The asymmetrical synchronization of the system described above, whereby only the base station synchronizes the system, optimizes this process. A mobile component can communicate its synchronization request while the system remains in asynchronous idle mode by transmitting shortened synchronization pulses referred to as interrogation pulses AP. Table 3 illustrates such a mobile component-specific interrogation pulse AP.

FIG. 12 is a simplified diagram of a synchronization window of a base station BS for receiving an interrogation pulse AP transmitted by a mobile component. If the interrogation pulse AP specified in Table 3 falls within the relatively very long SYNC window of a base station, on the basis of the RFPI (radio fixed part identity) it contains, the latter can establish the fact that this is a mobile component belonging to the system with a connection request. At its end, the base station now begins to transmit synchronization pulses SB. But the latter now also contain all information for the amplified synchronization information (XSync) required for the synchronization of the system, i.e., all mobile components.

In asymmetrical synchronization, the interrogation pulse AP from a mobile station, on the other hand, contains no such amplified synchronization information (XSync).

For example, at its end, the mobile component can search for the synchronization pulses SB from the base station, now awakened from the asynchronous idle mode, if it has been transmitting its interrogation pulses AP for a certain amount of time.

According to the present invention, in response to an incoming call, a device (e.g., base station) can transmit synchronization pulses SB on an agreed-upon frequency e.g. in the half-slot time grid. Instead of the usual ten milliseconds according to the conventional DECT standard, the time grid will now be 416 microseconds, for example. What is more, a mobile component, which in asynchronous mode is still enabling its receiving unit every 640 milliseconds, can find a usable synchronization pulse SB immediately and so, with a delay time of $t_r < 1$ s, can respond from the asynchronous idle mode. According to the time/frequency ranges shown in FIGS. 4 to 10, therefore, this means a synchronization at least 24 times faster. With synchronization pulses transmitted at an agreed-upon preferred frequency, this would mean synchronization up to even 240 times faster.

Although the asynchronous idle mode described above can be set in any manner, preferably there will be a defined shutdown to asynchronous idle mode, which hereinafter will also be referred to as the "no-emission," or "low-emission," mode.

As described above, in the so-called low-emission mode, all units (transmitters) at the base station BS and mobile component, or mobile components, MT1, MT2, will be completely disabled. There will also be no more limitation, as in the green DECT mode described at the outset, whereby the mode can be engaged only if just one mobile component is logged on and is also in the charging cradle.

The shutdown to idle mode is negotiated between all system components (base station and mobile components), and if an HF connection is required an algorithm ensures sufficiently short resynchronization times.

FIG. 13A to 13C are simplified state diagrams for illustrating a successful enabling of the idle mode and a refusal from the mobile component or the base station. "IWU" here refers to an "interworking unit," "MAC" to a "medium access controller" [sic].

According to FIG. 13A, the base station BS can be connected to multiple mobile components MT1 to MTn. After the communication system has been in idle for a certain time, and it is known that all mobile components MT1 to MTn control and have enabled (or not blocked) the asynchronous idle, or low-emission, mode, the base station, e.g., begins to transmit "countdown" information in the dummy bearer. According to FIGS. 13A to 13C, this will be implemented, for example, as a "PT-MAC" login (paging tail, medium access). The mobile components MT1 to MTn receive this login message and so are notified of the pending idle mode. No further communication between subscribers is required for successful entry into the mode.

To ensure minimum departure from normal dummy bearer messages, the PT-MAC message is transmitted in frame 0, while a standard message otherwise in this position is now transmitted in frame 1, which in idle mode, however, will not be received by mobile components MT1 to MTn. An "extend flag" in the PT-MAC message will also enable the mobile components to receive this frame 1.

Table 4 shows the general paging tail format.

TABLE 4

| PT-Header | 20 Bits of BS-Channel-Data | Info-Type | MAC-Info |
|---|---|---|---|
| a8 a11 | a12 a31 | a32 a35 | a36 a47 |

Table 5 below gives bearer-handover/replacement information (a36 to a47), where info type is (a32 to a35=1001).

TABLE 5

| Mac Info Type (a36 ... a39) | Parameter (a40 ... a47) | Meaning |
|---|---|---|
| 0000 | 00001111 | No bearer-handover/replacement for other RFPs; no intracell bearer-handover/replacement |
| 0001 | 00001111 | No bearer-handover/replacement for other RFPs; intracell bearer-handover/replacement is supported |
| 0010 | 00001111 | Bearer-handover/replacement is supported over entire internal handover range |
| 0011 | bit mask | Bearer-handover/replacement is supported for all RFPs with RFPI differing only in the masked bits |
| 0100 | a40-a43: scan-channel a44-a47: hyperframe-countdown | Idle-scan channel; number of hyperframes a) until dummy bearer is disabled |
| 0101 to 1111 | ) ) reserved ) | |

A hyperframe countdown, for example, may decrement in steps of 4 multiframes. The hyperframe counter is incremented if for modulo 4 a multiframe counter changes from 3 to 0. As shown in FIG. 13A, the dummy bearer DB is disabled after frame 0 in the first multiframe of the hyperframe involved.

According to FIG. 13B, the mobile components MT1 to MTn can inhibit the asynchronous idle mode, or low-emission mode, by establishing a MAC connection with the base station (e.g., location registration). At its end, the base station will then immediately terminate transmission of the countdown. After a still undetermined time, another attempt to enable the asynchronous idle mode can follow automatically.

There is currently no known reason for a mobile component to require a base station BS dummy bearer DB for a mobile component-local procedure.

Besides with the establishment of an MAC connection, the mobile component can also permanently inhibit the low-emission mode by means of an NWK layer message (Net-Work) or through a negotiation during login. Mobile components can establish in advance the precise time the dummy bearer DB will be disabled with a countdown counter.

If according to FIG. 13C the countdown terminates without the establishment of a setup in advance, as shown in FIG. 13B, all transmission units are disabled, and each device enters a special receive mode. In this way it becomes possible to engage the mode without first having to establish a separate connection with every mobile component. This works to the benefit of the spectral efficiency.

If the mobile component does not receive the frame in which the countdown counter counts to 0, the system status for this mobile component is unclear. It could therefore be in asynchronous idle mode (low-emission mode) or in normal mode, or the mobile component could be outside the range.

The following procedure could then be followed:
1. Normal search (scan) for base station
   ->mobile component receives base station->system status is normal mode.
2. Initiate wake-up call
   ->base station then becomes visible->system status returns to normal mode.
   ->base station is then not visible->mobile component must be outside the range/base out.

If the latter is the result, the mobile component should regularly repeat steps 1 and 2.

As described above, all mobile components, including the base station, in the communication system scan in asynchronous idle mode, or low-emission mode, at the preferred frequency, for example, for subscribers who are active. The base station can scan continuously, while the mobile components should always scan for relatively short periods so standby time remains comparable with normal mode. It is important here to find the best compromise between standby time and response time.

As initial value, it is assumed for the mobile components that they will scan for 10 to 20 milliseconds and that the subsequent search pauses (scan pauses) last approx. 600 milliseconds.

FIG. 14 is a simplified state diagram for illustrating the termination of an asynchronous idle mode from the base-station end, where the same reference keys identify the same or corresponding components as in FIGS. 13A to 13C, and repeated descriptions will be dispensed with below.

If the base station must terminate the asynchronous mode because of an incoming call, for example, it can first expand channel selection at, for example, a preferred frequency.

Selection can proceed in such a manner that full slots, long slots or both types can be selected. Every time slot FS which is sufficiently free and selectable in RX and TX time frame halves can be used to transmit a synchronization pulse SB, i.e., a dummy bearer with amplified synchronization information XSync.

Only one of the selected time slots will transmit a standard dummy bearer DB to which the synchronization pulses SB then refer.

The other selected full slots or long slots contain, e.g., two to five dummy bearers, which in the A field transmit only N frames and can hold amplified SYNC information XSync ready behind the A field CRC.

As described above on the basis of FIGS. 11A to 11C, the "full" or "long" time slot format is used only as "container." So at the receiver end it will not be necessary to support expanded time-slot formats as such. Reception as "full slot" is recommended since in this way the same information will be available as needed multiple times and so can be better validated.

So that synchronization pulses SB in the B field can be transmitted correctly to the mobile component, the scrambler should be disabled. So in the base station BS it may consequently be enough for the A field CRC segment for the synchronization pulses SB in the B field to be computed/stored once at system bootup, since the RFPI will not change.

For their own wake-up call, or interrogation pulses AP, the mobile components will need an algorithm with which the A field CRC segment can be computed for length. With changes to base filter, logon and logoff the RFPI can change frequently.

FIG. 14 shows this scenario in connection with FIGS. 11A to 11C, or alternatively Table 1, described above.

FIG. 15 is a simplified state diagram for illustrating a termination of the asynchronous idle mode at the mobile component end, where the same reference keys designate the same or corresponding components as in FIGS. 13 and 14, so for this reason a repeated description is dispensed with below.

If the mobile component wants to terminate the asynchronous idle mode, or "low-emission" mode, it can also briefly transmit one or more synchronization pulses SB at, for example, the preferred frequency. According to the description above, however, as interrogation pulses AP, these synchronization pulses SB must also contain no amplified synchronization information XSync if the base station does not need to synchronize itself with the mobile components, as is the case in the asymmetrical synchronization procedure. Since as in normal mobile-component operation the SYNC field is encoded, all system subscribers can distinguish between synchronization pulses from the base station and synchronization pulses from a mobile component (see also Table 3 or FIG. 11C).

The N frame contains the RFPI of the base station, which, for example, is to be awakened. Multiple synchronization pulses SB like this can be compressed into a single full slot to achieve a higher probability of reception by the base station. A full slot can contain as many as four synchronization pulses SB.

The synchronization-pulse phase should last only 2 to 4 time frames FR since the base station is scanning continuously anyway. If the base station BS receives a mobile component-specific synchronization pulse SB which contains its own RFPI, and at their end the base stations switch to the transmission of synchronization pulses SB [translator's note: text missing?]. Immediately following transmission of the synchronization pulses, or interrogation pulses, the initiating mobile component should terminate further transmission and switch to scanning for base station-specific synchronization pulses SB. For this mobile component a more intensive scanning may be indicated to accomplish setup with minimum delay.

The rest of the synchronization process follows as described above.

The process described above eliminates the need to implement synchronization mechanisms in the base station and, except with base stations, the need for mobile components to be able to synchronize themselves with other mobile components as well.

This also makes it possible to avoid problems if, in the case of collision, two or more mobile components want to establish a connection with the base station at the same time. During asynchronous idle mode this case is the equivalent of three or more different synchronization-pulse sources, so that at least two mobile components would have to adjust their synchronization.

Following a reset the base station BS can always start a short synchronization-pulse phase, since a network failure or other event could have caused a reset in the base station BS.

Ordinarily, the base station will know nothing of any preliminary events, or whether possibly the asynchronous idle mode, or low-emission mode, might have been active. Mobile components might possibly also still be in asynchronous idle mode and not have detected the base station reboot.

Something similar is true in the case of a mobile component booting up from the reset. If the mobile component is operating as part of a communication system that supports the asynchronous idle mode, it could be that the battery is dead and that the rest of the system is still in asynchronous idle mode. So an unsuccessful base station search (base station scan) should be followed by a wake-up call (transmission of interrogation pulses AP or synchronization pulses SB). These procedures are also covered by the state diagram according to FIG. 15.

The present invention has been described on the basis of a DECT communication system. It is not limited to DECT systems, however, and is similarly applicable to other TDMA-based communication systems with wireless interface using a synchronization pulse for rapid synchronization.

| KEYS TO DIAGRAMS | |
|---|---|
| 1 | receiving unit |
| 2 | processor/analysis unit |
| 3 | transmitting unit |
| 4 | control unit |
| 10 | device for controlling the establishment of a user channel connection |
| N | network |
| BS | base station |
| MT | mobile component |
| LV | local connection request |
| SB | synchronization request |
| AP | interrogation pulse |
| ND | user data |
| AE | analysis result |
| FR | time frame |
| FS | time slot |
| RX | reception time slot |
| TX | transmission time slot |
| BK | occupied channel |
| DB | dummy bearer |
| f | frequency |
| XSync | amplified synchronization information |
| S | position information |
| F | scrambler information |
| L | dummy bearer information |
| C | checksum |

The invention claimed is:

1. Device for controlling the establishment of a user channel connection in a communication system with wireless interface from an asynchronous idle mode, wherein the interface has a periodically recurring time frame (FR), with:

a receiving unit (1) for receiving input signals (SB) across the wireless interface;

a processor/analysis unit (2) for analyzing the received input signals (SB);

a transmitting unit (3) for transmitting output signals (ND) across the wireless interface; and a control unit (4) for controlling the transmitting unit (3) with reference to the processing/analysis result (AE), characterized in that the processor/analysis unit (2) detects a synchronization pulse (SB) with amplified synchronization information (XSync) giving location information for the synchronization pulse (SB) within the time frame FR and analyzes the location information (S); and the control unit (4) controls the transmitting unit (3) with the object of establishing a synchronous user channel connection corresponding to the analyzed location/position information.

2. Device according to patent claim 1 characterized in that the wireless communication within the communication system is handled at multiple frequencies (f) within a frequency range and in multiple timeslots (FS) per time frame (FR), whereby the number of time slots (FS) per time frame (FR) is divided into transmitting time slots (TX) and receiving time slots (RX).

3. Device according to patent claim 2 characterized in that the processor/analysis unit (2) in the position information (S) detects and analyzes time slot-related position information (S-Pos) as well as time-slot information (slot).

4. Device according to claim 2 characterized in that the processor/analysis unit (2) in the amplified synchronization information (XSync) detects and analyzes dummy-bearer information (L) giving a frequency (f) and a time slot (FS) at which a normal dummy bearer (DB) can be found.

5. Device according to claim 1 characterized in that the processor/analysis unit (2) in the amplified synchronization information (XSync) detects and analyzes transmitting frequency information (PSCN) and a frame counter (framecnt).

6. Device according to claim 1 characterized in that the processor/analysis unit (2) in the amplified synchronization information (XSync) detects and analyzes a checksum (C).

7. Device according to claim 1 characterized in that within the communication system communication is wireless according to the DECT standard.

8. Method for controlling the establishment of a user-channel connection in a communication system with wireless interface from an asynchronous idle mode, wherein the interface has a periodically recurring time frame (FR), comprising the following steps:

reception of input signals (SB) across the wireless interface;

analysis of received input signals (SB); and transmission of output signals (ND) across the wireless interface with reference to processing/analysis results (AE), whereby in the processing/analysis, a synchronization pulse (SB) with amplified synchronization information (XSync) giving position information (S) for the synchronization pulse (SB) within the time frame (FR) is detected and the position information (S) is processed/analyzed; and in transmission, a synchronous user-channel connection based on the processed/analyzed position information is established.

9. Method according to patent claim 8 whereby the wireless communication in the communication system is handled at multiple frequencies (f) within a frequency range and in multiple time slots (FS) per time frame (FR), wherein the number of time slots (FS) per time frame (FR) is divided into transmission time slots (TX) and reception time slots (RX).

10. Method according to patent claim 9 where in the processing/analysis of position information (S) time slot-related position information (S-Pos) and time slot information (Slot) are detected and processed/analyzed.

11. Method according to claim 9 whereby in the analysis of the amplified synchronization information (XSync) dummy bearer information (L) is detected and analyzed, which gives a frequency (f) and a time slot (FS) at which a normal dummy bearer (DB) can be found.

12. Method according to claim 8 whereby in the processsing/analysis of the amplified synchronization information (XSync) transmission information (PSCN) and a frame counter (framecnt) are detected and analyzed.

13. Method according to claim 8 whereby in the processing of the amplified synchronization information (XSync) a checksum (C) is detected and analyzed.

14. Method according to claim 8 whereby within the communication system, communication is wireless in accordance with the DECT standard.

15. Non-transitory digital storage medium with electrically readable control signals which can operate with a programmable computer system for controlling the establishment of a user-channel connection in a communication system with wireless interface from an asynchronous idle mode, wherein the interface has a periodically recurring time frame (FR), comprising the following steps:

reception of input signals (SB) across the wireless interface;

analysis of received input signals (SB); and transmission of output signals (ND) across the wireless interface with reference to processing/analysis results (AE), whereby in the processing/analysis, a synchronization pulse (SB) with amplified synchronization information (XSync) giving position information (S) for the synchronization pulse (SB) within the time frame (FR) is detected and the position information (S) is processed/analyzed; and in transmission, a synchronous user-channel connection based on the processed/analyzed position information is established.

16. Computer program product with program code stored on a non-transitory machine-readable medium for implementing the establishment of a user-channel connection in a communication system with wireless interface from an asynchronous idle mode, wherein the interface has a periodically recurring time frame (FR), comprising the following steps:

reception of input signals (SB) across the wireless interface;

analysis of received input signals (SB); and transmission of output signals (ND) across the wireless interface with reference to processing/analysis results (AE), whereby in the processing/analysis, a synchronization pulse (SB) with amplified synchronization information (XSync) giving position information (S) for the synchronization pulse (SB) within the time frame (FR) is detected and the position information (S) is processed/analyzed; and in transmission, a synchronous user-channel connection based on the processed/analyzed position information is established.

* * * * *